(12) United States Patent
Rivera Espinoza et al.

(10) Patent No.: US 11,678,224 B2
(45) Date of Patent: Jun. 13, 2023

(54) AGGREGATING MULTIPLE DATA STREAMS ON A COMMUNICATION LINK

(71) Applicant: Apple Inc., Cupertino, CA (US)

(72) Inventors: Jorge L. Rivera Espinoza, San Jose, CA (US); Venkatesh Rajendran, San Jose, CA (US); Derek Fujio Iwamoto, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/379,088

(22) Filed: Jul. 19, 2021

(65) Prior Publication Data

US 2022/0353736 A1 Nov. 3, 2022

Related U.S. Application Data

(60) Provisional application No. 63/180,958, filed on Apr. 28, 2021.

(51) Int. Cl.
*H04W 28/06* (2009.01)
*H04W 56/00* (2009.01)
*H04W 4/18* (2009.01)
*H04W 76/10* (2018.01)

(52) U.S. Cl.
CPC ............ *H04W 28/06* (2013.01); *H04W 4/18* (2013.01); *H04W 56/0045* (2013.01); *H04W 76/10* (2018.02)

(58) Field of Classification Search
CPC ....... H04W 28/06; H04W 76/10; H04W 4/18; H04W 56/0045
USPC ................ 370/350, 329, 328, 338, 341, 345
See application file for complete search history.

(56) References Cited

U.S. PATENT DOCUMENTS

| 8,006,023 B1 | 8/2011 | Pan et al. | |
| 8,620,308 B2 * | 12/2013 | Maria | H04L 12/66 455/406 |
| 10,547,339 B2 | 1/2020 | Shiu et al. | |
| 2008/0247550 A1 * | 10/2008 | Kozaki | H04L 9/12 380/278 |

(Continued)

OTHER PUBLICATIONS

Partial International Search Report for PCT Application No. PCT/US2022/024838 dated Aug. 4, 2022; 12 pgs.

(Continued)

*Primary Examiner* — Nghi H Ly
(74) *Attorney, Agent, or Firm* — Fletcher Yoder, P.C.

(57) ABSTRACT

A host device establishes a wireless communication link with a client device, and implements a wired communication standard on the link to transfer a first data stream. To increase data throughput while complying with the standard, the host device replaces synchronizing information in a packet to be sent during a first synchronizing frame with configuration information indicating that packet exchange data of a second data stream is to be sent or received during a second synchronizing frame. The host device sends or receives the packet exchange data of the second data stream to or from the client device during the second synchronizing frame via the wireless communication link. The host device may send or receive the packet exchange data of the second data stream during delays or idle periods between sending and/or receiving packets of the first data stream via the wireless communication link according to the wired communication standard.

25 Claims, 21 Drawing Sheets

(56) References Cited

U.S. PATENT DOCUMENTS

2012/0063376 A1     3/2012   Kambhatla et al.
2018/0027494 A1*   1/2018   Huang .................. H04W 68/00
                                                                                370/311
2018/0269947 A1*   9/2018   Levitsky .............. H04B 7/0695

OTHER PUBLICATIONS

Su Khiong Yong, An Overview of Multigigabit Wireless through Millimeter Wave Technology: Potentials and Technical Challenges, EURASIP Journal, 2007, vol. 2007, Article ID 78907, 10 pages.

* cited by examiner

| | TRANSFERS | TRANSACTIONS | BUS UTILIZATION |
|---|---|---|---|
| HS CONTROL | 1 | 6 | 18.96% |
| HS BULK | 1 | 13 | 98.28% |
| HS INTERRUPT | 2 | 3 | 86.32% |
| HS ISOCHRONOUS | 2 | 3 | 84.96% |

*FIG. 15*

| | MAX PACKET LENGTH | POTENTIAL SLOTS | INTERPACKET | TURNAROUND |
|---|---|---|---|---|
| HS CONTROL | 3.95 | 9 | 3 | 6 |
| HS CONTROL READ | 3.95 | 9 | 3 | 6 |
| HS BULK OUT | 9.45 | 3 | 1 | 2 |
| HS BULK IN | 9.45 | 3 | 1 | 2 |
| HS INTERRUPT OUT | 17.983333 | 3 | 1 | 2 |
| HS INTERRUPT IN | 17.983333 | 3 | 1 | 2 |
| HS ISOCHRONOUS OUT | 17.7 | 2 | 2 | 0 |
| HS ISOCHRONOUS IN | 17.7 | 2 | 0 | 2 |

*FIG. 16*

| USB SPEC SYNTHETIC HIGH UTILIZATION SCENARIOS | TOTAL TRANSFER TIME | USB µFRAME UTILIZATION | TURNAROUND | PEX DATA (BYTES) PER 125µs µFRAME | PEX DATA (BITS PER SECOND) | IDLE PEX DATA (BYTES) PER 125µs µFRAME | IDLE PEX DATA (BPS) PER FRAME | TOTAL PEX DATA BITS PER SECOND |
|---|---|---|---|---|---|---|---|---|
| 6x ISOC OUT + 1 BULK OUT | 115.65µs | 92.52% | 2 | 8 | 512,000 | 184 | 11,776,000 | 12,288,000 |
| 6x ISOC OUT + 4 CTRL WRITE | 122µs | 97.6% | 24 | 96 | 6,144,000 | 60 | 3,840,000 | 9,984,000 |

*FIG. 17*

| USB SPEC SYNTHETIC HIGH UTILIZATION SCENARIOS | TOTAL TRANSFER TIME | USB μFRAME UTILIZATION | INTER+TURN | PEX DATA (BYTES) PER 125μs μFRAME | PEX DATA (BITS PER SECOND) | IDLE PEX DATA (BYTES) PER 125μs μFRAME | IDLE PEX DATA (BPS) PER FRAME | TOTAL PEX DATA BITS PER SECOND |
|---|---|---|---|---|---|---|---|---|
| 6x ISOC OUT + 1 BULK OUT | 115.65μs | 92.52% | 9 | 36 | 2,304,000 | 184 | 11,776,000 | 14,080,000 |
| 6x ISOC OUT + 4 CTRL WRITE | 122μs | 97.6% | 48 | 192 | 12,288,000 | 60 | 3,840,000 | 16,128,000 |

*FIG. 18*

AGGREGATING MULTIPLE DATA STREAMS ON A COMMUNICATION LINK

CROSS-REFERENCE TO RELATED APPLICATION

This application claims the benefit of U.S. Provisional Application No. 63/180,958, filed Apr. 28, 2021, entitled, "AGGREGATING MULTIPLE DATA STREAMS ON A COMMUNICATION LINK," which is incorporated by reference in its entirety for all purposes.

BACKGROUND

The present disclosure relates generally to data communication, and more specifically to increasing data throughput on a communication link between communicating devices.

Electronic devices may communicate with one another by sending and/or receiving a data stream over a communication link using a communication standard. To increase data throughput, the electronic devices may communicate with one another by sending and/or receiving multiple, bidirectional data streams using multiple communication standards over the link. However, implementing multiple, bidirectional data streams using multiple communication standards over a communication link may increase hardware complexity in the electronic devices, use higher order modulation and/or higher frequency bandwidth, use complex protocol adapter layers and/or specialized software drivers, and/or increase resource (e.g., current) consumption.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes establishing a wireless communication link with an electronic device, sending data of a first data stream to the electronic device via the wireless communication link using a wired communication standard, and generating a packet to be sent during a first synchronizing frame of the wired communication standard by replacing synchronizing information with configuration information indicating that packet exchange data of a second data stream is to be sent or received during a second synchronizing frame of the wired communication standard. The method also includes sending the packet to the electronic device via the wireless communication link, receiving an acknowledgement from the electronic device via the wireless communication link, and sending or receiving the packet exchange data of the second data stream to or from the electronic device via the wireless communication link.

In another embodiment, an electronic device includes one or more antennas, transmit circuitry that transmits signals via the one or more antennas, receive circuitry that receives signals from the one or more antennas, and at least one processor coupled to the transmit circuitry and the receive circuitry. The at least one processor establishes a wireless communication link with an additional electronic device, causes the receive circuitry to receive data of a first data stream from the additional electronic device via the wireless communication link using a wired communication standard, and causes the receive circuitry to receive a first packet during a first synchronizing frame of the wired communication standard from the additional electronic device via the wireless communication link. The at least one processor also, in response to determining that the first packet has configuration information associated with packet exchange data of a second data stream to be sent or received during a second synchronizing frame of the wired communication standard, generates and processes a second packet according to the wired communication standard, and causes the receive circuitry to receive or the transmit circuitry to transmit the packet exchange data of the second data stream from the additional electronic device during the second synchronizing frame of the wired communication standard.

In yet another embodiment, an electronic device includes one or more antennas, transmit circuitry that sends signals from the one or more antennas, receive circuitry that receives signals from the one or more antennas, and at least one processor coupled to the transmit circuitry and the receive circuitry. The at least one processor determines a delay between sending a first packet of a first data stream and sending or receiving a second packet of the first data stream via a wireless communication link according to a wired communication standard. The at least one processor also indicates that packet exchange data of a second data stream will be sent during the delay, and causes the transmit circuitry to send the first packet of the first data stream via the wireless communication link using the wired communication standard. The at least one processor further causes the transmit circuitry to send the packet exchange data of the second data stream via the wireless communication link during the delay, and causes the transmit circuitry to send or causes the receive circuitry to receive the second packet of the first data stream via the wireless communication link using the wired communication standard.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 15 is a table that indicates bus allocation per the USB 2.0 standard;

FIG. 16 is a table that indicates a maximum number of delays available per the USB 2.0 standard;

FIG. 17 is a table that indicates maximum packet exchange data throughput during turnaround delays and/or idle times for scenarios where USB 2.0 data maximizes usage of a wireless communication link, according to an embodiment of the present disclosure;

FIG. 18 is a table that indicates maximum packet exchange data throughput during interpacket delays and turnaround delays, as well as idle times for scenarios where USB 2.0 data maximizes usage of a wireless communication link, according to an embodiment of the present disclosure;

DETAILED DESCRIPTION OF SPECIFIC EMBODIMENTS

Figure 1:
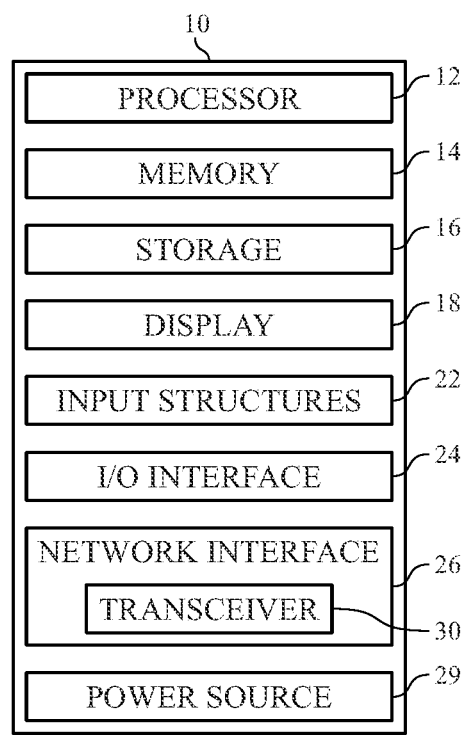
FIG. 1 is a block diagram of an electronic device, according to an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

This disclosure is directed to increasing data throughput on a communication link (e.g., wired or wireless) between communicating devices. Electronic devices may communicate with one another by sending and/or receiving a data stream via a communication link using a communication standard. To increase data throughput (e.g., data transfer or signaling), the electronic devices may communicate with one another by sending and/or receiving multiple, bidirectional data streams using one or more communication standards over a radio frequency link. For example, a first electronic device (e.g., a host device) may establish a wireless communication link with a second electronic device (e.g., a client device) using any suitable radio frequency communication technology, including a non-standards-based millimeter wave (mmWave) technology operating on an Extremely High Frequency (EHF) band as designated by the International Telecommunication Union (ITU). The EHF band may include the radio frequencies in the electromagnetic spectrum from 30 to 300 gigahertz (GHz), such as 60 GHz. As such, the wireless communication link may be referred to herein as an EHF wireless communication link. Additionally, the host device may send or receive a first data stream, such as a Universal Serial Bus (USB) 2.0 data stream, over the wireless communication link. That is, the wireless communication link may replicate or virtualize the USB 2.0 communication link, even though USB 2.0 is a wired communication standard. Accordingly, the host device and the client device may send and/or receive the first data stream such that it conforms to the USB 2.0 standard.

It may be desired to implement the USB 2.0 standard on the wireless communication link as it enables high data throughput. To aggregate additional data streams to be sent over the wireless communication link, a USB 2.0 endpoint may be terminated at a transmitter of the host device. The USB 2.0 data stream may then be packetized with additional data streams (e.g., including USB 2.0 data streams, other USB generation data streams, Universal Asynchronous Receiver/Transmitter (UART) data streams, Serial Wire Debug (SWD) data streams, Serial Peripheral Interface (SPI) data streams, and Inter-Integrated Circuit (I2C) data streams, and so on), and sent as packets over the wireless communication link to a receiver of the client device. The receiver may then decompose the packetized data into respective data streams and process the data streams. For example, the extracted USB 2.0-related may be forwarded to a USB 2.0 host controller in the receiver, which may reconstruct a USB 2.0 interface. While the present disclosure illustrates embodiments as applied to implementing USB 2.0 data streams on an EHF wireless communication link 38, it should be understood that the embodiments may also be applied to other communication standards or technologies (e.g., wired or wireless). For example, the wireless communication link 38 may be a Bluetooth® link and/or there may be one or more data streams of different types, including any version of a USB data stream, such as USB 1 (e.g. USB 1.x), USB 2.0 (e.g., USB 2.x), USB 3 (e.g., USB 3.x), USB 4 (e.g., USB 4.x), a low-voltage differential signaling (LVDS) standard as used by a DisplayPort digital display interface, and so on.

However, terminating the wireless USB 2.0 link at the host device may add circuitry, components, and/or complexity (e.g., both in logic and memory) at the host device, use additional resources (e.g., memory and processing resources), and take up valuable space in the host device. Additionally, to enable the high data transfer rate available under USB 2.0 in high speed operation (e.g., 480 Megabits per second (Mbps)), the data transfer rate of a conventional radio frequency communication link may be increased. This may mean employing higher order modulation and/or a higher frequency bandwidth for data transfer, adding circuitry, components, and/or complexity at both devices, using additional resources (e.g., memory and processing resources), and taking up valuable space in the devices. Additionally, operating a USB 2.0 endpoint in an electronic device may increase resource (e.g., current) consumption.

Embodiments herein provide various systems, apparatuses, and techniques to increase data throughput (e.g., transfer rate) on a communication link (e.g., a wired communication link, a wireless communication link) between communicating devices implementing a wired communication standard (e.g., the USB 2.0 standard, the USB 3 standard, the USB 4 standard, and so on) by leveraging known delay times in the wired communication standard to transmit and receive additional, other data (e.g., referred to herein as packet exchange or "PEX" data) across the communication link. For example, the disclosure embodiments may natively stream USB 2.0 packets over a wireless communication link while taking advantage of known USB 2.0 delay times to transmit and receive additional packet exchange data across the communication link. As a result, implementing USB device and host controllers in the transceivers of the communicating devices may be avoided. Moreover, the data rate across the communication link for the USB 2.0 data may be maintained at no more than 480 Mbps, thus avoiding implementation of higher order modulation and/or higher frequency bandwidth. Additionally, when aggregating the packet exchange data with the USB 2.0 data over the communication link, the combined data rate may exceed 480 Mbps (e.g., greater than 520 Mbps, greater than 640 Mbps, greater than 720 Mbps, greater than 1000 Mbps, and so on).

In particular, some disclosed embodiments cause a first electronic device (e.g., a host device) to initially establish a wireless communication link, such as an EHF communication link, with a second electronic device (e.g., a client device). The host device may then implement a wired communication standard (e.g., the USB 2.0 standard) on the wireless communication link, such that it may send and/or receive data of a first data stream (e.g., a USB 2.0 data stream) to and/or from the client device. The host device may generate a deterministic packet according to the wired communication standard that, in some instances, may be removed during transmission over the wireless communication link and replaced with packet exchange data (or "PEX" data) of a second data stream (e.g., including another USB 2.0 data stream, another USB generation data stream, an SWD data stream, a UART data stream, an SPI data stream, an I2C data stream, or the like). Deterministic packet may refer to a packet that is sent or received between the host and client devices that has timing, content, fields, and so on, that is known and expected by both devices. Thus, the deterministic packet is predetermined and expected by both devices, and enables removal by the host device and recreation by the client device, even though the client device may receive a substitute packet in place of the deterministic packet from the host device. Packet exchange data may refer to any suitable type of data (e.g., payload data, configuration data, housekeeping data, control data, timing data, and so on), of any suitable standard or protocol (e.g., USB 2.0, another USB standard, UART, SPI, I2C, SWD, audio) to be exchanged between the host and client devices. Upon receiving the packet exchange data, the client device may process the packet exchange data, and recreate the deterministic packet that was removed by the host device to comply with the wired communication standard. This enables significant flexibility for wirelessly transferring the packet exchange data (of multiple possible data streams), while complying with the wired communication standard.

For example, the host device may generate a synchronizing packet (e.g., a start of frame (SOF) packet) to be sent during a first synchronizing frame (e.g., a start of frame) according to the wired communication standard by replacing synchronizing information (such as that used to synchronize isochronous and interrupt data transfers) with configuration information indicating that the packet exchange data of the second data stream is to be sent or received during a second synchronizing frame according to the wired communication standard. In the USB 2.0 standard, the host device may transmit eight SOF packets per frame to the client device, dividing the one millisecond frame into eight 125 microsecond microframes. The portion of each microframe devoted to the SOF packet (e.g., between 158.33 nanoseconds (ns) and 200 ns) may be referred to generally as a "synchronizing frame" herein, and the SOF packet may be referred to generally as a "synchronizing packet" herein. As some synchronizing packets may still be used to facilitate or perform synchronization or interruption functions between the devices, in some cases, only some of the synchronizing packets may be replaced with configuration or packet exchange data. The host device may then send the synchronizing packet to the client device via the wireless communication link. After the client device acknowledges receiving the synchronizing packet, the host device may send or receive the packet exchange data of the second data stream to or from the client device via the wireless communication link. In this manner, the host device may wirelessly send or receive a second data stream in synchronizing packets, in addition to a first data stream in conventional data packets per the USB 2.0 standard. While the synchronizing packet is used as an example of the deterministic packet that may be removed and replaced by the host device and recreated by the client device, it should be understood that the disclosed embodiments may apply to any suitable deterministic packet.

Accordingly, the client device may initially establish a wireless communication link with the host device using the wireless communication technology, and receive a first synchronizing packet during a first synchronizing frame according to the wired communication standard from the host device via the wireless communication link. If the client device determines that the first synchronizing packet includes configuration information associated with the packet exchange data of the second data stream to be sent or received during a second synchronizing frame according to the wired communication standard, then the client device may generate and process a second synchronizing packet according to the wired communication standard. That is, to conform to the USB 2.0 standard, an SOF packet should be received at the beginning of each 125 microsecond microframe. Because the host device sent configuration information instead of an SOF packet to the client device, to conform with the USB 2.0 standard, the client device should still process an SOF packet during the first synchronizing frame. As such, the client device may generate and process the second synchronizing packet according to the wired communication standard. The client device then send or receives the packet exchange data of the second data stream to or from the host device during the second synchronizing frame. As with the configuration information, the client device may generate and process a third synchronizing packet according to the wired communication standard in place of the packet exchange data of the second data stream sent or received during the second synchronizing frame. That is, because the client device sent or received packet exchange data of the second data stream instead of receiving an SOF packet from the host device, to conform to the USB 2.0 standard, the client device should still process an SOF packet during the second synchronizing frame. As such, the client device may generate and process the third synchronizing packet according to the wired communication standard. In this manner, the client device may wirelessly send or receive a second data stream in synchronizing packets, in addition to a first data stream in conventional data packets per the USB 2.0 standard.

Additional or alternative embodiments provide various systems, apparatuses, and techniques to increase data throughput on wireless communication links between communicating devices by causing the transmitting device to determine a delay (e.g., gaps in time) between sending and/or receiving first and second packets of a first data stream via a wireless communication link according to a wired communication standard. For example, the delay may correspond to a turnaround delay between the host device sending a packet (e.g., a data packet) to the client device and receiving a responding packet (e.g., a handshake packet) from the client device. As another example, the delay may correspond to an interpacket delay between the host device sending a first packet (e.g., a token packet) and a second packet (e.g., a data packet). The host device may then indicate that packet exchange data of a second data stream will be sent or received during the delay, and send the first data packet via the first wireless communication link using the wired communication standard. The host device may send or receive the packet exchange data of the second data stream during the delay via the wireless communication link, and send or receive the second packet of the first data stream after the delay using the wired communication standard. In this manner, the host device may wirelessly send or receive a second data stream during delays between sending or receiving packets of a first data stream.

The client device may thus receive the first packet of the first data stream, and receive the indication that the packet exchange data of the second data stream will be received or sent during the delay between receiving the first packet and sending or receiving the second packet of the first data stream. As such, the client device may receive or send the packet exchange data of the second data stream during the delay, and then, after the delay, the client device may receive or send the second packet of the first data stream via the second wireless communication link. In this manner, the client device may wirelessly receive or send a second data stream during delays between receiving packets of a first data stream.

In some cases, the host device may determine to extend the delay between sending packets of the first data stream, thus increasing the time between sending the packets and increasing the amount of packet exchange data of the second data stream sent or received during the extended delay. For example, the host device may determine that to extend the delay because a size of packet exchange data to be transmitted is greater than a threshold size. In some embodiments, the host device may include a buffer to delay or time-shift packets of the first data stream during the extended delay, which may then be sent after the extended delay has elapsed. As such, the host device, in response to determining to extend the delay, may indicate an extended delay between sending the first and second packets of the first data stream and that packet exchange data of the second data stream will be sent or received during the extended delay. The host device may then send the first packet of the first data stream via the wireless communication link using the wired communication standard, and send or received the packet exchange data during the extended delay via the wireless communication link. The host device may cause the buffer to delay or time-shift the second packet of the first data stream, and, in response to determining that the extended delay has elapsed, send the second packet via the wireless communication link using the wired communication standard. In this manner, the client device may wirelessly send or receive an increased amount of a second data stream by extending delays between sending packets of a first data stream.

As such, the client device may receive a first packet of the first data stream via the wireless communication link using the wired communication standard. In response to receiving an indication that the delay between receiving the first and second packets of the first data stream has been extended and that packet exchange data of the second data stream will be received or sent during the extended delay, the client device may receive or send the packet exchange data during the extended delay via the wireless communication link. After the extended delay has elapsed, the client device may receive the second packet of the first data stream via the first wireless communication link using the wired communication standard. In this manner, the client device may wirelessly receive or send an increased amount of a second data stream during extended delays between receiving packets of a first data stream.

Additionally or alternatively, the presently disclosed embodiments may increase data throughput on a wireless communication link between communicating devices by causing transmission or reception of a second data stream between transactions of the first data stream. That is, there may be times (e.g., idle times) when the communicating devices are not performing transactions. For example, in the USB 2.0 standard, a transaction includes sending or receiving a number of packets, including token packets, data packets, and handshake packets. However, after a first transaction, there may be no data to transfer between the communicating devices. At a subsequent time, there may be a desire to transfer data, and a second transaction may be performed. Between these two transactions is an idle time, which may be used to send packets of the second data stream. In this manner, the devices may wirelessly send or receive an increased amount of a second data stream between transactions of a first data stream.

With the preceding in mind, FIG. 1 is a block diagram of an electronic device 10, according to an embodiment of the present disclosure. With reference to the preceding discussion, the host device, the client device, or both, may include the electronic device 10. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including computer code stored on a computer-readable medium) or a combination of both hardware and software elements. The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may represent a block diagram of any suitable computing device, including a desktop or notebook computer (e.g., in the form of a MacBook®, MacBook® Pro, MacBook Air®, iMac®, Mac® mini, or Mac Pro® available from Apple Inc. of Cupertino, Calif.), a portable electronic or handheld electronic device such as a wireless electronic device or smartphone (e.g., in the form of a model of an iPhone® available from Apple Inc. of Cupertino, Calif.), a tablet (e.g., in the form of a model of an iPad® available from Apple Inc. of Cupertino, Calif.), a wearable electronic device (e.g., in the form of an Apple Watch® by Apple Inc. of Cupertino, Calif.), and other similar devices. It should be noted that the processor 12 and other related items in FIG. 1 may be generally referred to herein as "data processing circuitry." Such data processing circuitry may be embodied wholly or in part as software, software, hardware, or any combination thereof. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein and below.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, Calif., a universal serial bus (USB), or other similar connector and protocol. The network interface 26 may include, for example, one or more interfaces for a personal area network (PAN), such as a Bluetooth® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a satellite network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. On the other hand, the processor 12, as discussed herein, may refer to processing circuitry of the transceiver 30. The transceiver 30 may support transmission and receipt of various wireless signals via one or more antennas (not shown in FIG. 1). The power source 29 of the electronic device 10 may include any suitable source of power, such as a rechargeable lithium polymer (Li-poly) battery and/or an alternating current (AC) power converter. In certain embodiments, the electronic device 10 may take the form of a computer, a portable electronic device, a wearable electronic device, or other type of electronic device.

Figure 2:
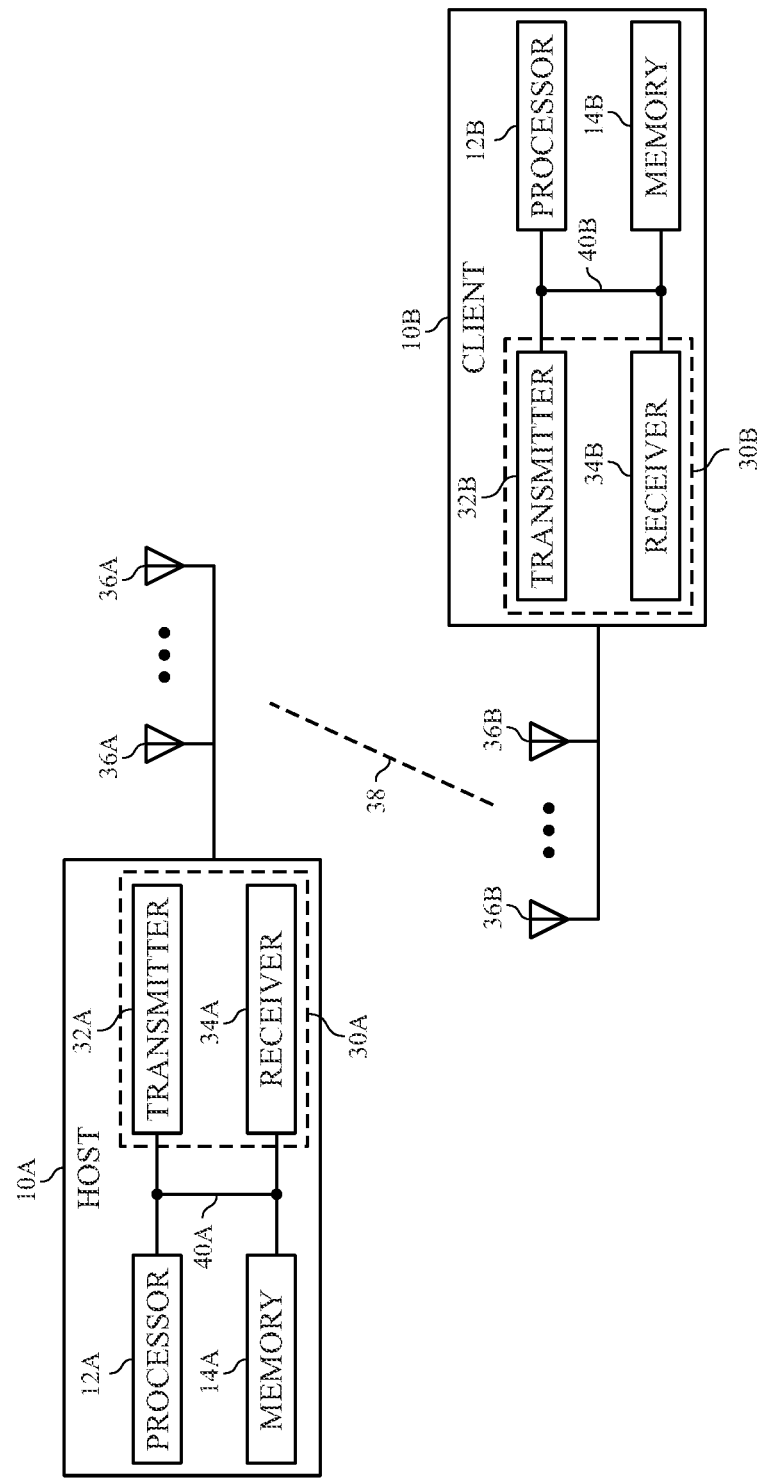
FIG. 2 is a functional block diagram of electronic devices that may implement the components of the electronic device of FIG. 1, according to an embodiment of the present disclosure.

FIG. 2 is a functional block diagram of electronic devices 10A, 10B (collectively the electronic device 10) that may implement the components of electronic device 10 shown in FIG. 1, according to embodiments of the present disclosure. As illustrated, each of the processors 12A, 12B (collectively the processor 12), the memories 14A, 14B (collectively the memory 14), the transceivers 30A, 30B (collectively the transceiver 30), the transmitters 32A, 32 (collectively the transmitter 32), the receivers 34A, 34B (collectively the receiver 34), and/or the antennas 36A, 36B (collectively the antennas 36) of a respective electronic device (respectively 10A, 10B) may be communicatively coupled directly or indirectly (e.g., through or via another component, a communication bus, a network) to one another to transmit and/or receive data between one another.

The electronic device 10A may include the transmitter 32A and/or the receiver 34A that respectively enable transmission and reception of data between the electronic device 10A and the receiver 34A and/or the transmitter 32A of the electronic device 10B via a communication link 38, including a wired or wireless communication link, through a network or direct connection, and using any suitable communication technology, including a radio frequency or wireless technology (e.g., a non-standards-based communication technology, a millimeter wave (mmWave) technology, an mmWave technology operating on the EHF band, an mmWave technology operating on the 60 GHz band, a Near Field Communication (NFC) standard, a Bluetooth® standard, a Universal Serial Bus (USB) standard, and so on).

For example, an EHF communication link (e.g., provided via mmWave antennas) may enable communication between the electronic devices 10A, 10B for a relatively short distance range (e.g., within 10 meters, within 5 meters, within 1 meter, within 50 centimeters, within 20 centimeters, within 15 centimeters, within 10 centimeters, within 5 centimeters, within 4 centimeters, and so on). The 60 GHz band may be unlicensed, and as such, enables flexibility in operation, though it is contemplated that the EHF communication link may be used on other unlicensed frequency bands, or licensed frequency bands, subject to any applicable licensing or regulatory constraints. Moreover, implementing the EHF communication link with amplitude-shift keying (ASK) modulation may be relatively simple and cost-efficient, while avoiding the latency issues that come with more complex modulation/demodulation schemes. By utilizing the near field (e.g., closer range) offered by the EHF communication link, and placing the antennas 36A, 36B of the electronic devices 10A, 10B within relatively close proximity to each other (e.g., within 10 meters, within 1 meter, within 50 centimeters, within 5 centimeters, and so on), a relatively error free channel may be realized, which can reduce or eliminate the implementation of error detection and correction routines or components, which would further reduce complexity of the electronic devices 10A, 10B and latency in communications between the electronic devices 10A, 10B. As such, the electronic devices 10A, 10B may establish an EHF wireless communication link 38, and then send data streams of different communication standards, including wired communication standards, such as USB 2.0, over the EHF communication link 38. Such data streams may thus conform to their respective communication standards.

In some instances, the electronic devices 10A, 10B may have a host/client relationship, such that one of the electronic devices 10A, 10B (e.g., the host device) controls the communication link 38 between the electronic devices 10A, 10B. For example, if the electronic device 10A controls the communication link 38 between the electronic devices 10A, 10B, then the electronic device 10A is the host device, and the electronic device 10B is the client or peripheral device.

As illustrated, each transmitter 32 and receiver 34 may be combined into a transceiver 30. Each electronic device 10 may also have one or more antennas 36 electrically coupled to the transceiver 30. The antennas 36 may be configured in an omnidirectional or directional configuration, in a single-beam, dual-beam, or multi-beam arrangement, and so on. Each antenna 36 may be associated with a one or more beams and various configurations. In some embodiments, each beam, when implement as multi-beam antennas, may correspond to a respective transceiver 30. The electronic device 10 may include (not shown) multiple transmitters, multiple receivers, multiple transceivers, and/or multiple antennas as suitable for various communication standards.

The transmitter 32 may wirelessly transmit packets having different packet types or functions. For example, the transmitter 32 may transmit packets of different types generated by the processor 12. The receiver 34 may wirelessly receive packets having different packet types. In some examples, the receiver 34 may detect a type of a packet used and process the packet accordingly. In some embodiments, the transmitter 32 and the receiver 34 may transmit and receive information via other wired or wireline systems or means.

As illustrated, the various components of the electronic device 10 may be coupled together by a bus system 40 (e.g., 40A, 40B). The bus system 40 may include a data bus, for example, as well as a power bus, a control signal bus, and a status signal bus, in addition to the data bus. The components of the electronic device 10 may be coupled together or accept or provide inputs to each other using some other mechanism.

Figure 3:
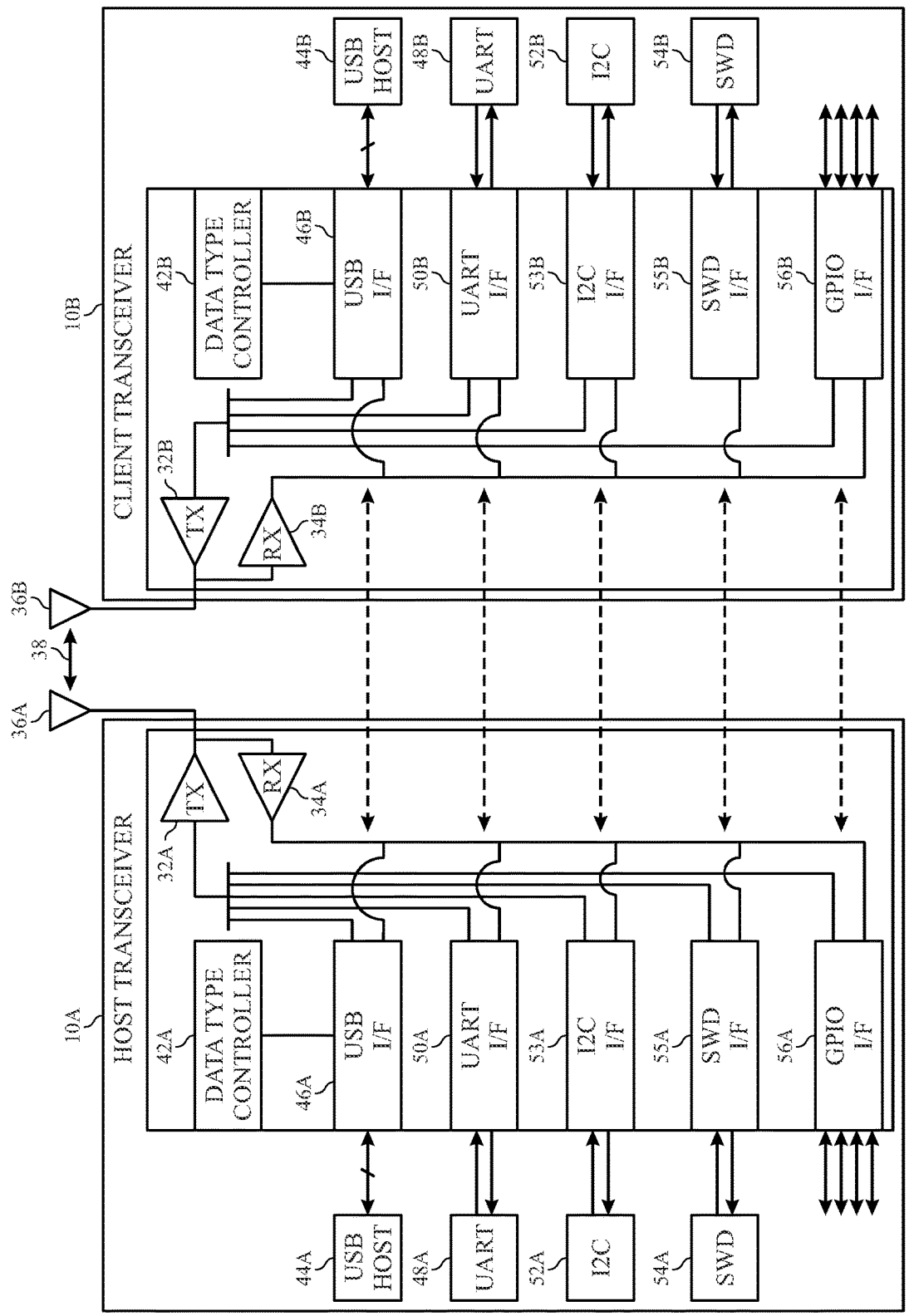
FIG. 3 is a schematic diagram of the electronic devices of FIG. 2 transmitting and receiving multiple data streams over a wireless communication link, according to an embodiment of the present disclosure.

FIG. 3 is a schematic diagram of the electronic devices 10A, 10B transmitting and receiving multiple data streams over a wireless communication link (e.g., the communication link 38), according to an embodiment of the present disclosure. The transceiver 30A, 30B of each electronic device 10A, 10B may include a data-type controller 42A, 42B, which may determine an input data type of data from an incoming data stream, and determine how to transmit or receive the data. As illustrated, the host device 10A may include a USB (e.g., USB 2.0) host controller 44A that generates, sends, and/or receives USB data (e.g., USB 2.0 data). The client device 10B may include a USB (e.g., USB 2.0) (client) device controller 44B that generates, sends, and/or receives USB data (e.g., USB 2.0 data). The respective transceivers 30A, 30B of the host and client devices 10A, 10B may have corresponding USB interfaces 46A, 46B (e.g., USB 2.0 interfaces), that send and receive data with the respective USB host controller 44A and USB device controller 44B at high speed (e.g., according to eUSB2 (embedded USB 2.0)) eUSB2 is a supplement to the USB 2.0 specification that addresses issues related to interface controller integration with advanced system-on-chip (SoC) process nodes. As illustrated, the host and client devices 10A, 10B may also respectively include a UART controller 48A, 48B that generates, sends, and/or receives UART data, an I2C controller 52A, 52B that generates, sends, and/or receives I2C data, and an SWD controller 54A, 54B that generates, sends, and/or receives SWD data. Moreover, the host and client devices 10A, 10B may respectively include general purpose I/O (GPIO) interfaces 56A, 56B that send and/or receive GPIO data to and/or from GPIO pins of the host and client devices 10A, 10B. It should be understood more or fewer of sets of controllers and/or interfaces may be included in the host and client devices 10A, 10B (such as SPI controllers and/or interfaces, audio controllers and/or interfaces, and so on).

In the illustrative example, when transmitting data, the USB 2.0 host controller 44A may send the USB 2.0 data (e.g., high speed data) to the USB interface 46, the UART controller 48A may send UART data to the UART interface 60A, the I2C controller 52A may send I2C data to the I2C interface 53A, the SWD controller 54A may send SWD data to the SWD interface 55A, and/or GPIO pins provide GPIO data to the GPIO interface 56A. The data-type controller 42A may packetize the USB 2.0 data (e.g., of a first data stream) with the UART data (e.g., of a second data stream), the I2C data (e.g., of a third data stream), the SWD data (e.g., of a fourth data stream), and/or the GPIO data (e.g., of a fifth data stream), and send the resulting packet(s) to the transmitter 32A to transmit to the client device 10B via the antenna(s) 36A (e.g., mmWave antennas) over the communication link 38 (e.g., an EHF wireless communication link). The UART data, I2C data, SWD data, and GPIO data (as well as other suitable data of other protocols or standards) may be referred to as packet exchange (e.g., PEX) data. The communication link 38 may be half duplex, such that it may allow transmission of data in one direction at one time.

Upon reception of the packet(s) at the receiver 34B via the antenna(s) 36B (e.g., mmWave antennas) over the communication link 38, the data-type controller 42B of the client device 10B may extract and send the USB 2.0 data to the USB interface 46B, which in turn sends the USB 2.0 data to the USB device controller 44B. The data-type controller 42B may also extract and send the UART data to the UART interface 50B, which in turn sends the UART data to the UART controller 48B, extract and send the I2C data to the I2C interface 53B, which in turn sends the I2C data to the I2C controller 52B, and extract and send the SWD data to the SWD interface 55B, which in turn sends the SWD data to the SWD controller 54B. The data-type controller 42B may extract and send the GPIO data to the GPIO interface 56B, which in turn may send the GPIO data to GPIO pins of the client device 10B. It should be understood that the client device 10B may send USB 2.0 data, UART data, I2C data, SWD data, and/or GPIO data to the host device 10A using similar processes (e.g., in reverse order).

In this manner, data of multiple data streams may be sent over the communication link 38. As discussed in further detail below, the data-type controllers 42A, 42B may natively stream USB 2.0 (e.g., without additional encoding or packetizing) over the communication link 38 while sending or receiving packet exchange data (e.g., the UART data, I2C data, SWD data, and/or GPIO data) during USB 2.0 idle times across the communication link 38. Advantageously, implementing USB 2.0 host and device controllers in the transceivers 30A, 30B of the host and client devices 10A, 10B may be avoided (e.g., instead only USB 2.0 interfaces 46A, 46B may be implemented in the host and client devices 10A, 10B). Moreover, the data rate across the communication link 38 for the USB 2.0 data may be maintained at no more than 480 Mbps, thus avoiding implementation of higher order modulation and/or higher frequency bandwidth. However, when aggregating the packet exchange data with the USB 2.0 data over the communication link 38, the combined data rate may exceed 480 Mbps (e.g., greater than 520 Mbps, greater than 640 Mbps, greater than 720 Mbps, greater than 1000 Mbps, and so on).

Figure 4:
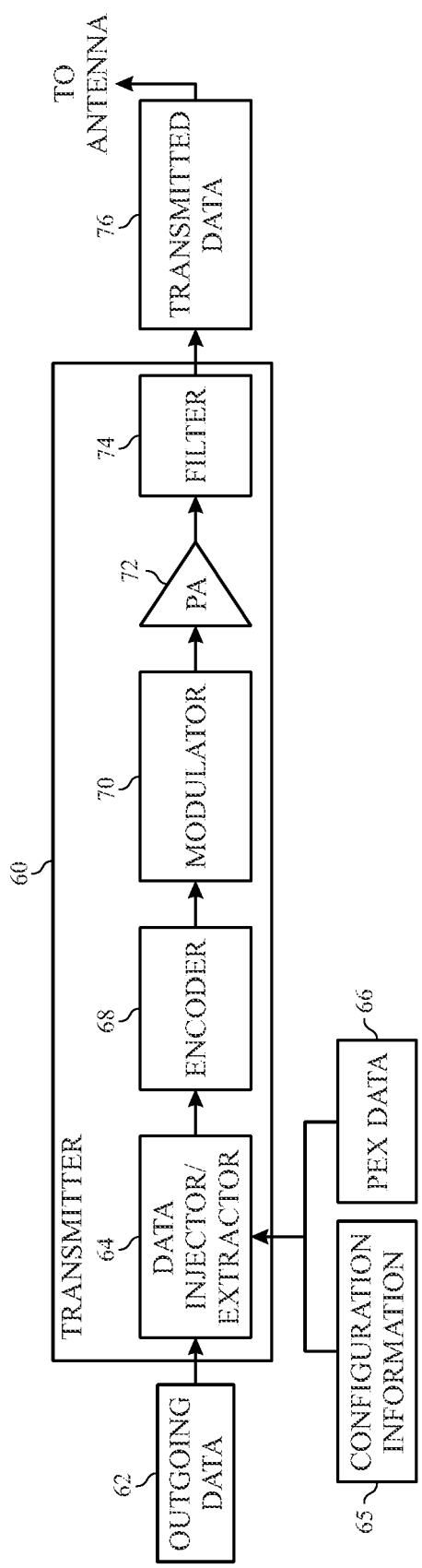
FIG. 4 is a schematic diagram of a transmitter of the electronic devices of FIG. 1 that may wirelessly send packet exchange data in synchronizing packets, according to an embodiment of the present disclosure.

FIG. 4 is a schematic diagram of a transmitter 60 (e.g., a transmit circuit) of the electronic device 10 of FIG. 1 that may wirelessly send packet exchange data in synchronizing packets, according to an embodiment of the present disclosure. In particular, the transmitter 32 of the electronic device 10 of FIG. 2 may include the transmitter 60. As illustrated, the transmitter 60 may receive outgoing data 62 to be sent to another electronic device (e.g., the electronic device 10B). In some cases, the outgoing data 62 may be in the form of a packet of a first data stream (e.g., of a USB 2.0 data stream). Additionally or alternatively, the packet may be a synchronizing packet that includes synchronizing information, such as that used to synchronize isochronous and interrupt data transfers. For example, for the USB 2.0 standard, the synchronizing packet may include a start of frame (SOF) packet.

In any case, the outgoing data 62 may be in the form of a digital signal to be transmitted via the one or more antennas 36. In some embodiments, the transmitter 60 may include a data injector/extractor 64 (e.g., data injection/extraction circuitry and/or software) that may extract synchronizing information (e.g., a synchronizing packet, such as a start of frame packet of the USB 2.0 standard) from the outgoing data 62, inject configuration information 65 (e.g., indicating that packet exchange or "PEX" data 66 of a second data stream is to be sent or received during a second synchronizing frame), and/or inject the packet exchange data 66 of the second data stream into the outgoing data 62. For example, during a first synchronizing frame (e.g., a start of frame of the USB 2.0 standard), the data injector/extractor 64 may inject the configuration information 65 into the outgoing data 62 in place of the synchronizing information. As another example, during the synchronizing frame, the data injector/extractor 64 may inject packet exchange data 66 into the outgoing data 62 in place of the synchronizing information. In some embodiments, the data injector/extractor 64 may include a data aggregation state machine that aggregates the data to be sent in the packet exchange data 66. In additional or alternative embodiments, the processor 12 may include the data injector/extractor 64 (e.g., data injector/extractor circuitry, data injector/extractor software, or both). The packet exchange data 66 may include any suitable data that the transmitter 60 to a receiver (e.g., the receiver 34 of the electronic device 10B), such as payload data, user data, control information, housekeeping or maintenance data used to maintain the electronic device 10A, the electronic device 10B, or both (e.g., including data indicating a quality of the wireless communication link between the electronic devices 10A, 10B), data related to other components and/or protocols used by the electronic device 10A, the electronic device 10B, or both, control data, timing data, and so on, of any suitable standard or protocol (e.g., USB 2.0, another USB standard, UART, SPI, I2C, SWD, audio) to be exchanged between the electronic devices 10A, 10B. Accordingly, the second data stream of the packet exchange data 66 may include data streams of any suitable communication standard or standard, such as another USB 2.0 data stream, another USB generation data stream, a UART data stream, an SPI data stream, an I2C data stream, an SWD data stream, an audio data stream, a video data stream, or the like.

An encoder 68 of the transmitter 60 may encode the digital signal as an analog signal, perform any encoding schemes, packetize the data in the digital signal, and so on. A modulator 70 may combine the encoded analog signal with a carrier signal to generate a radio wave. A power amplifier (PA) 72 receives signal the modulated signal from the modulator 70. The power amplifier 72 may amplify the modulated signal to a suitable level to drive transmission of the signal via the one or more antennas 36. A filter 74 (e.g., filter circuitry and/or software) of the transmitter 60 may then remove undesirable noise from the amplified signal to be transmitted via the one or more antennas 36. The filter 74 may include any suitable filter or filters to remove the undesirable noise from the amplified signal, such as a bandpass filter, a bandstop filter, a low pass filter, a high pass filter, and/or a decimation filter.

Additionally, the transmitter 60 may include any suitable additional components not shown, or may not include certain of the illustrated components, such that the transmitter 60 may transmit the outgoing data 62 via the one or more antennas 36. For example, the transmitter 60 may include a mixer and/or a digital up converter. As another example, the transmitter 60 may not include the filter 74 if the power amplifier 72 outputs the amplified signal in or approximately in a desired frequency range (such that filtering of the amplified signal may be unnecessary). In this manner, the transmitter 60 may wirelessly send packet exchange data in synchronizing packets, and thus send multiple data streams using the wireless communication link 38.

Figure 5:
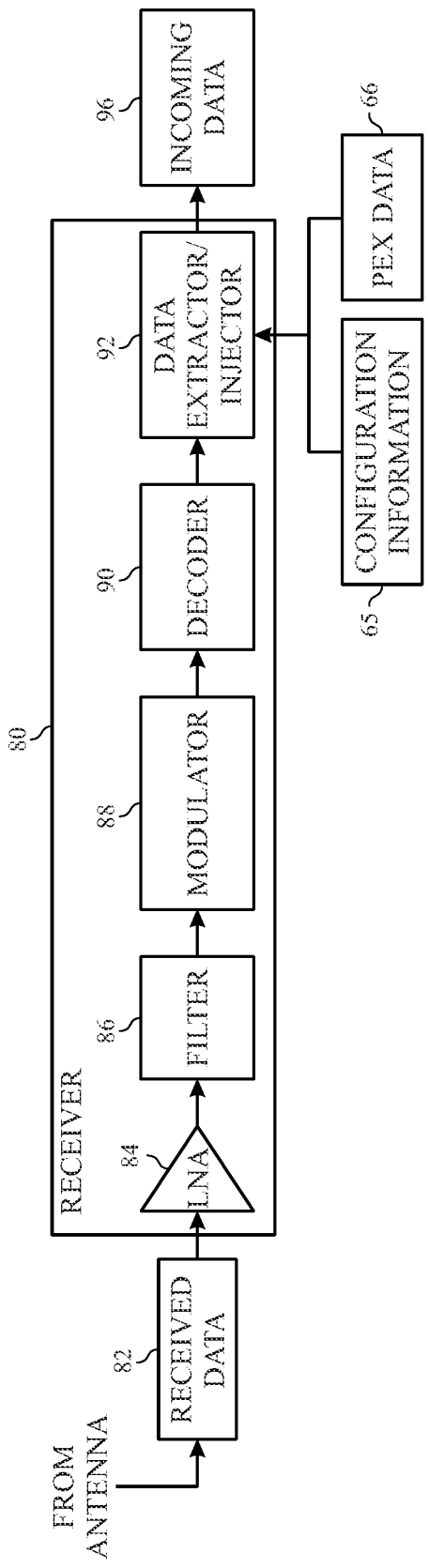
FIG. 5 is a schematic diagram of a receiver of the electronic devices of FIG. 1 that may wirelessly receive packet exchange data in synchronizing packets, according to an embodiment of the present disclosure.

FIG. 5 is a schematic diagram of a receiver 80 (e.g., a receive circuit) of the electronic device 10 of FIG. 1 that may wirelessly receive packet exchange data in synchronizing packets, according to an embodiment of the present disclosure. In particular, the receiver 34 of the electronic device 10 of FIG. 2 may include the receiver 80. As illustrated, the receiver 80 may receive received data 82 from the one or more antennas 36 in the form of an analog signal. A low noise amplifier (LNA) 84 may amplify the received analog signal to a suitable level for the receiver 80 to process. A filter 86 (e.g., filter circuitry and/or software) may remove undesired noise from the received signal, such as cross-channel interference. The filter 86 may also remove additional signals received by the one or more antennas 36 which are at frequencies other than the desired signal. The filter 86 may include any suitable filter or filters to remove the undesired noise or signals from the received signal, such as a bandpass filter, a bandstop filter, a low pass filter, a high pass filter, and/or a decimation filter. A demodulator 88 may remove a radio frequency envelope and/or extract a demodulated signal from the filtered signal for processing. A decoder 90 may receive the demodulated analog signal and decode the signal to a digital signal, perform any decoding schemes, and/or depacketize the data in the demodulated analog signal into the different, multiple data streams, so that it may be further processed by the electronic device 10.

A data extractor/injector 92 (e.g., data extraction circuitry/software and/or data injection circuitry/software) may receive the decoded digital signal, extract the configuration information 65 (e.g., indicating that the packet exchange data 66 of the second data stream is to be sent or received during a second synchronizing frame), extract the packet exchange data 66, and/or inject synchronizing information. In particular, the data injector/extractor 64 of the transmitter 60 of FIG. 4 may have extracted synchronizing information (e.g., a synchronizing packet, such as a start of frame packet of the USB 2.0 standard), and injected the configuration information 65 and/or the packet exchange data 66 of the second data stream into the received data 82 in place of the synchronizing information. As such, the receiver 80 may receive the received data 82 during a synchronizing frame (e.g., a start of frame of the USB 2.0 standard), and the data extractor/injector 92 may extract the configuration information 65 and/or the packet exchange data 66 of the second data stream from the digital signal. Moreover, the data extractor/injector 92 may inject synchronizing information (e.g., the synchronizing packet, such as a start of frame packet of the USB 2.0 standard) in place of the extracted packet exchange data 66 to conform with an applicable standard (e.g., the USB 2.0 standard), generating incoming packet data 96.

Accordingly, in some cases, the incoming data 96 may be in the form of a synchronizing packet, such as a start of frame packet of the USB 2.0 standard. In some embodiments, the incoming data 96 may be in the form of a packet of the first data stream. In additional or alternative embodiments, the processor 12 may include the data extractor/injector 92 (e.g., data extractor/injector circuitry, data extractor/injector software, or both). Additionally, the receiver 80 may include any suitable additional components not shown, or may not include certain of the illustrated components, such that the receiver 80 may receive the received data 82 via the one or more antennas 36. For example, the receiver 80 may include a mixer and/or a digital down converter. In this manner, the receiver 80 wirelessly receive packet exchange data in synchronizing packets, and thus receive multiple data streams using the wireless communication link 38.

Figure 6:
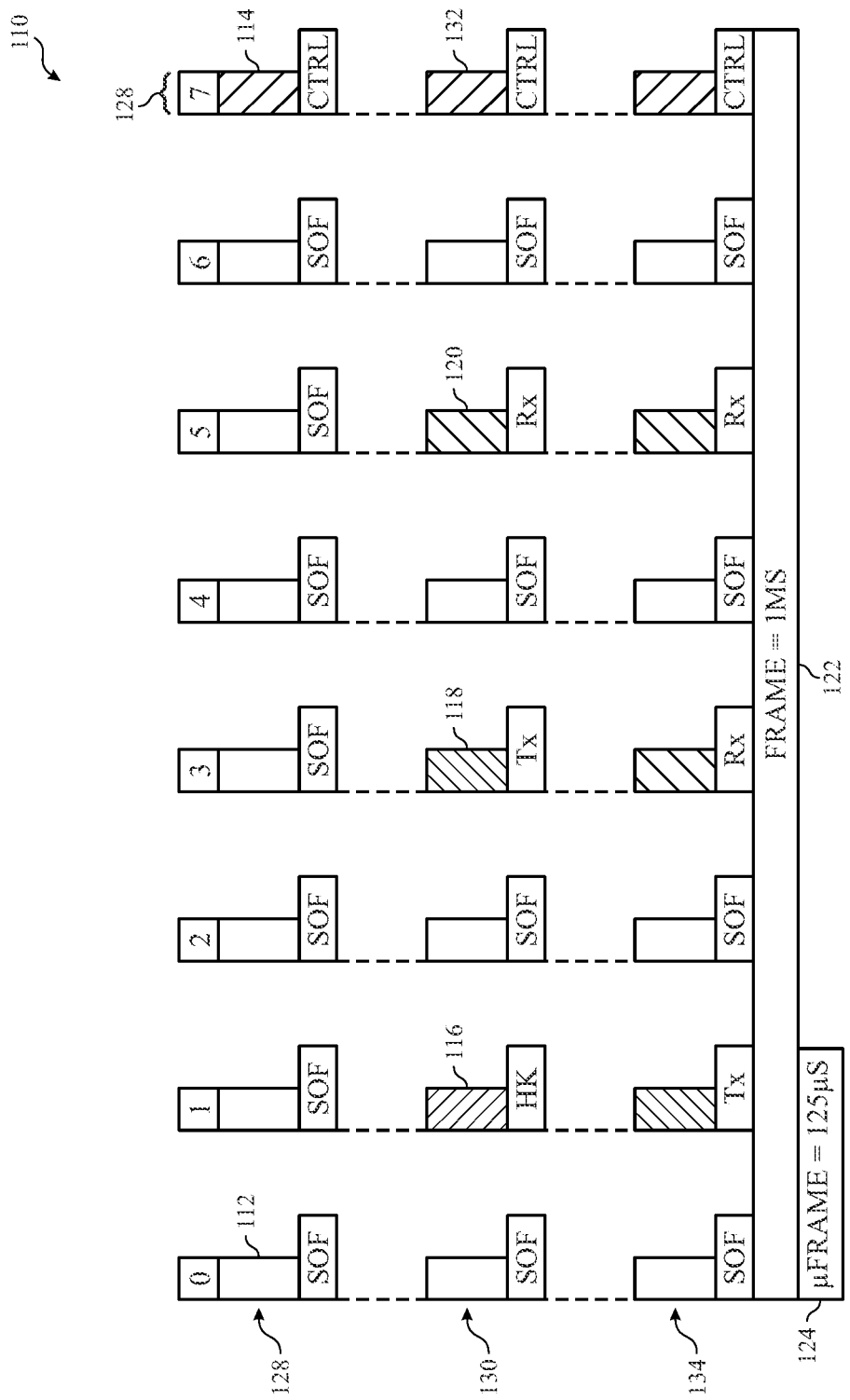
FIG. 6 is a timing diagram of synchronizing information of a first data stream being replaced with configuration information and/or packet exchange data of a second data stream, according to embodiments of the present disclosure.

Turning now to FIG. 6, a timing diagram 110 is illustrated that shows synchronizing information (e.g., in the form of start of frame packets 112) in a first data stream (e.g., a USB 2.0 data stream) being replaced with configuration information 65 (as indicated by control ("CTRL") data 114) and/or packet exchange data 66 (as indicated by housekeeping ("HK") data 116, transmit ("TX") data 118, or receive ("RX") data 120) of other data streams, according to embodiments of the present disclosure. While the present disclosure illustrates embodiments as applied to implementing USB 2.0 data streams on an EHF wireless communication link 38, it should be understood that the embodiments may also be applied to other communication standards or technologies (e.g., wired or wireless). For example, the wireless communication link 38 may be a Bluetooth® link and/or there may be one or more data streams of different types, including any version of a USB data stream, such as USB 1 (e.g. USB 1.x), USB 2.0 (e.g., USB 2.x), USB 3 (e.g., USB 3.x), USB 4 (e.g., USB 4.x), a low-voltage differential signaling (LVDS) standard as used by a DisplayPort digital display interface, and so on.

In the USB 2.0 standard, a frame 122 may have a duration of one millisecond, and eight SOF packets 112 may be transmitted per frame, thus dividing the one millisecond frame 122 into eight 125 microsecond microframes 124. The SOF packet 112 may indicate a start of a new frame 122 (and thus is sent or received every one millisecond), or in the case of USB 2.0 (e.g., at least in a high speed (HS) mode), indicate a start of new microframe 124 (and thus is sent or received every 125 milliseconds). The portion of each microframe 124 devoted to the SOF packet 112 may be referred to generally as a "synchronizing frame" herein, and the SOF packet 112 may be referred to generally as a "synchronizing packet" herein. The USB 2.0 standard includes multiple modes (e.g., a low speed (LS) mode, a full speed (FS) mode, and the HS mode), and at least some of those modes (e.g., FS mode, HS mode) includes the use of the SOF packets 112. According to the USB 2.0 standard, each SOF packet 112 may have a minimum length of 76 bits and a maximum length of 96 bits, and the portion of each microframe 124 devoted to the SOF packet 112 is, at a minimum, 158.33 nanoseconds (ns), and, at a maximum, 200 ns. As such, a varying timeframe of between 158.33 ns and 200 ns may be available to send and/or receive configuration information 65 (e.g., indicating the packet exchange data 66) or the packet exchange data 66 of a second data stream is one SOF packet 112 of a first USB 2.0 data stream is replaced. It should be understood that at least some of the SOF packets 112 may not be replaced with configuration information 65 or packet exchange data 66, as the remaining SOF packets 112 may be used to facilitate or perform synchronization or interruption functions between the electronic devices 10A, 10B. Accordingly, the present disclosure contemplates replacing up to half (e.g., four) of the SOF packets 112 in each frame 122) with configuration information 65 and/or packet exchange data 66, such that synchronizing information may still be provide by the remaining half of the SOF packets 112. However, it should be understood that any suitable number of SOF packets (e.g., 1-8) in a frame 122 may be replaced configuration information 65 and/or packet exchange data 66.

In particular, after the wireless communication link 38 is established and/or after the USB 2.0 link is established on the wireless communication link 38, the host device (e.g., the electronic device 10A) and the client device (e.g., electronic device 10B) may wait a predetermined or minimum number of frames 122 to ensure that the data injector/extractor 64 is prepared to aggregate and/or inject the packet exchange data 66. This may include counting a number of SOFs and/or identifying a sequence/pattern of the SOF packets 112, as there may be no alignment between the transceivers 30 of the host and client devices. Once the predetermined or minimum number of frames 122 have elapsed and/or the data injector/extractor 64 is prepared, the data injector/extractor 64 of the host device may replace a last SOF (e.g., in microframe 7) in a frame 122 with the configuration information 65 indicating SOF configuration for the next frame 122. That is, the last SOF packet 112 of the frame 122 may indicate the SOFs of the next frame 122 that may store the packet exchange data 66, and/or inform the client device how to operate the next frame 122.

For example, as illustrated, the data injector/extractor 64 has replaced a last SOF packet 112 of the last SOF 126 (e.g., SOF7) of the first frame 128 with configuration information 65 (CTRL 114). The configuration information 65 (CTRL 114) indicates that the next frame 130 will have housekeeping data (HK 116) in SOF1, transmit data (TX 118) in SOF3, and receive data (RX 120) in SOF5. Each of the housekeeping data (HK 116), the transmit data (TX 118), and the receive data (RX 120) may be of a different data stream than that sent using the USB 2.0 standard (e.g., including data packets sent using the USB 2.0 standard). As referred to herein, housekeeping or maintenance data includes data used to maintain the host and/or client devices, data indicating a quality of the wireless communication link between the host and/or client devices, data related to other components and/or standards used by the host and/or client devices, and so on. Transmit data is data that the host device is transmitting to the client device, and receive data is data that the host device is receiving from the client device. As such, replacing the SOF packets 112 with packet exchange data 66 may enable exchange of multiple, bidirectional (e.g., from host device to client device, and from client device to host device) data streams.

The host device transmits the configuration information 65 (CTRL 114) in the last SOF 126 (e.g., SOF7) of the first frame 128, and waits for acknowledgement from the client device within the same SOF 126 (e.g., SOF7). If the acknowledgement is received from the client device, then, on the next frame 130, the host device transfers an SOF packet 112 (e.g., during SOF0) according to the USB 2.0 standard, and the data injector/extractor 64 of the host device replaces the second SOF packet 112 with housekeeping data (HK 116) in SOF1. The host device also transfers the SOF packet 112 (e.g., during SOF2) according to the USB 2.0 standard, and the data injector/extractor 64 replaces the fourth SOF packet 112 with transmission data (TX 118), such as user data, control information, and so on, in SOF3. The host device additionally transfers the SOF packet 112 (e.g., during SOF4) according to the USB 2.0 standard, and the data injector/extractor 64 may remove the fourth SOF packet 112 and receive the receive data (RX 120) such as user data, control information, and so on, from the client device in SOF5. The host device also transfers the SOF packet 112 (e.g., during SOF6) according to the USB 2.0 standard. The data injector/extractor 64 may then replace the last SOF packet 132 (SOF7) of the frame 130 with configuration information 65 (CTRL) indicating SOF configuration for the next frame 134.

The wireless communication link 38 may continue operation in this manner and the host device may dynamically adjust usage and capacity of the wireless communication link 38, enabling multiple configurations of SOFs. Additionally, the host and/or the client device may return the SOF operation to the USB 2.0 standard with SOF packets 112 sent at each SOF when desired (e.g., by sending an instruction in the last SOF (SOF7)). Accordingly, if up to four of the SOF packets 112 in each frame 122 may be replaced with configuration information 65 and/or packet exchange data 66, and the last SOF packet 112 (SOF7) of a frame 122 is replaced with configuration information 65, then a total timeframe of at most three SOFs, or 474.99 to 600 nanoseconds, in the frame 122 may be replaced with packet exchange data 66 of one or more data streams having a total size of 228 to 288 bits. In this manner, by leveraging the SOF packets 112 of the USB 2.0 standard to bidirectionally send and/or receive multiple data streams (e.g., the housekeeping data (HK 116) of a second data stream in SOF1, the transmit data (TX 118) of a third data stream in SOF3, and the receive data (RX 120) of a fourth data stream in SOF5, communication using the USB 2.0 standard over the wireless communication link 38 may continue without interruption or error, while increasing overall data throughput.

Figure 7:
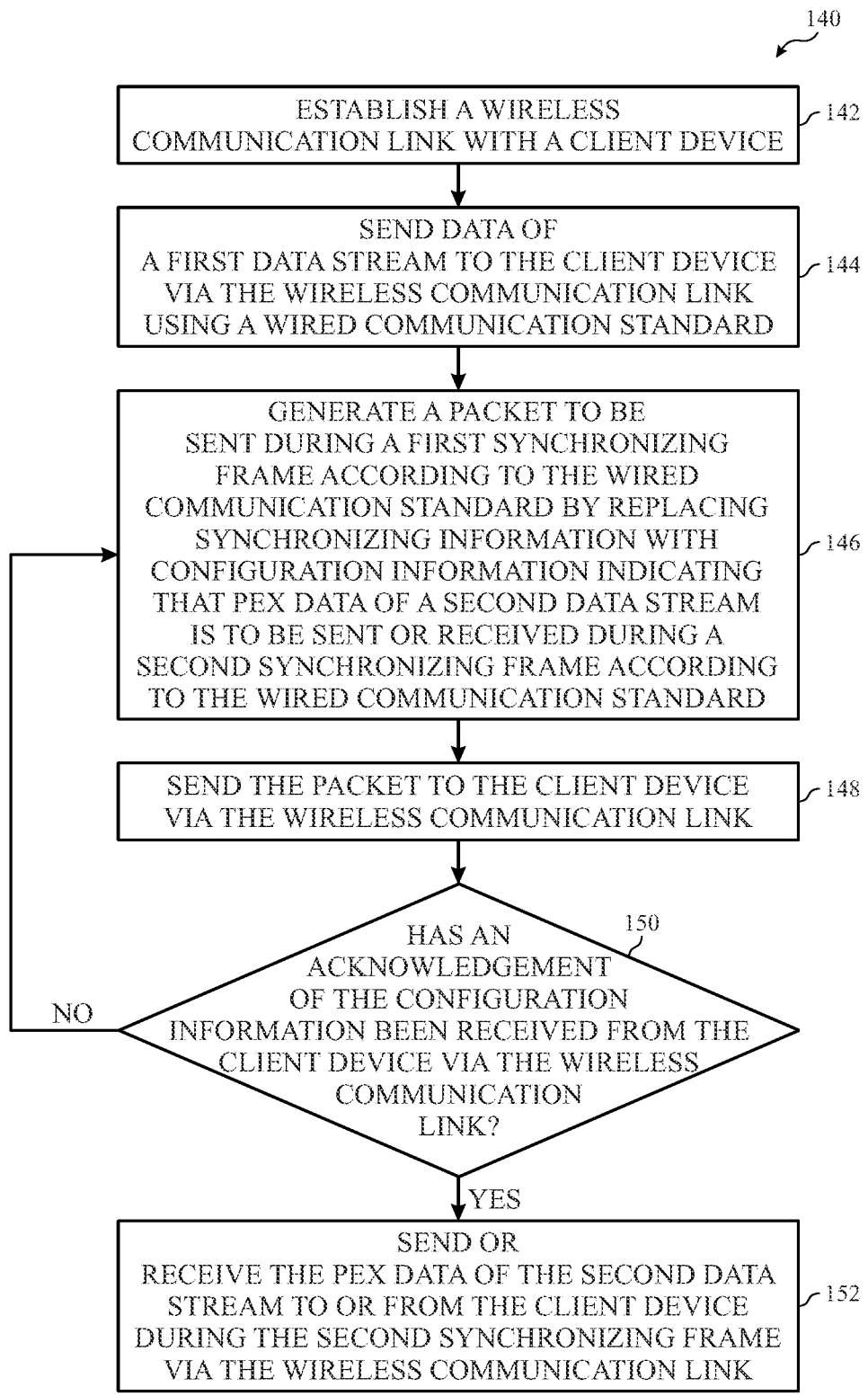
FIG. 7 is a flowchart of a method for an electronic device of FIG. 1 (e.g., a host device) to wirelessly send and/or receive a second data stream in SOF packets, according to embodiments of the present disclosure.

FIG. 7 is a flowchart of a method 140 for the electronic device 10A (e.g., the host device) to wirelessly send and/or receive a second data stream in the SOF packets 112, according to embodiments of the present disclosure. Any suitable device (e.g., a controller) that may control components of the electronic device 10A, such as the processor 12A (e.g., as processing circuitry of the transceiver 30), may perform the method 140. In some embodiments, the method 140 may be implemented by executing instructions stored in a tangible, non-transitory, computer-readable medium, such as the memory 14A or storage 16A, using the processor 12A. For example, the method 140 may be performed at least in part by one or more software components, such as an operating system of the electronic device 10A, one or more software applications of the electronic device 10A, and the like. While the method 140 is described using steps in a specific sequence, it should be understood that the present disclosure contemplates that the described steps may be performed in different sequences than the sequence illustrated, and certain described steps may be skipped or not performed altogether.

In process block 142, the processor 12A of the host device establishes the wireless communication link 38 with the electronic device 10B (e.g., client device). For example, the wireless communication link 38 may implement the mmWave technology on the EHF band (e.g., a 60 GHz band), the NFC standard, the Bluetooth® standard, any suitable wireless peer-to-peer communication technology or standard, any suitable wireless network communication technology or standard, and so on. In some embodiments, the processor 12A may subsequently establish an additional communication link (e.g., wired or wireless) on the wireless communication link 38, including any version of a USB data stream, such as USB 1, USB 2.0, USB 3, USB 4, or a low-voltage differential signaling (LVDS) standard as used by a DisplayPort digital display interface. That is, the wireless communication link 38 may replicate or virtualize the USB 2.0 communication link. In some embodiments, the wireless communication link 38 is an EHF link that replicates or virtualizes the wired USB 2.0 communication link.

In process block 144, the processor 12A sends data of a first data stream to the client device via the wireless communication link 38 using a wired communication standard. For example, the processor 12A may cause the transmitter 60 of the host device to send a token packet, a data packet (e.g., having payload data), or the like, of a USB 2.0 data stream to the client device via the EHF link using the USB 2.0 standard. In particular, the processor 12A may send a predetermined or minimum number packets to ensure that the data injector/extractor 64 is prepared to aggregate and/or inject the packet exchange data 66.

In process block 146, the processor 12A generates a packet (e.g., a synchronizing packet) to be sent during a first synchronizing frame according to the wired communication standard by replacing synchronizing information with the configuration information 65 indicating that the packet exchange data 66 of a second data stream is to be sent or received during a second synchronizing frame according to the wired communication standard. In particular, the processor 12A may cause the data injector/extractor 64 to generate a SOF packet 112 to be sent during an SOF (such as a last SOF (SOFT)) according to the USB 2.0 standard by replacing synchronizing information of the SOF with the configuration information 65 indicating that the packet exchange data 66 of a second data stream e.g., including another USB 2.0 data stream, another USB generation data stream, a UART data stream, an SPI data stream, an I2C data stream, an SWD data stream, or the like) is to be sent or received during a second SOF according to the USB 2.0. Using the example of the timing diagram 110 of FIG. 6, the data injector/extractor 64 may generate the SOF packet 112 to be sent in the last SOF 126 (e.g., SOF7) of the first frame 128 by replacing the synchronizing information of the SOF packet 112 with configuration information 65 (CTRL 114). The configuration information 65 (CTRL 114) indicates that the next frame 130 will have housekeeping data (HK 116) (e.g., of a second data stream) in SOF1, transmit data (TX 118) e.g., of a third data stream) in SOF3, and receive data (RX 120) (e.g., of a fourth data stream) in SOF5.

In process block 148, the processor 12A sends the packet to the client device via the wireless communication link 38. That is, the processor 12A may cause the transmitter 60 to send the SOF packet 112 with the configuration information 65 to the client device via the EHF link.

In decision block 150, the processor 12A determines whether an acknowledgement of the configuration information 65 has been received from the client device via the wireless communication link 38. In particular, the processor 12A may, in process block 148, cause the transmitter 60 to send the SOF packet 112 in a SOF, and wait for acknowledgement from the client device. If not, then the processor 12A repeats process block 146 in an attempt to set up sending or receiving the packet exchange data 66. In some embodiments, the processor 12A may wait for acknowledgement from the client device within the same SOF. Using the example of the timing diagram 110 of FIG. 6, the processor 12A may cause the transmitter 60 to send the SOF packet 112 in the last SOF 126 (e.g., SOF7) of the first frame 128, and wait for acknowledgement from the client device within the same SOF 126. The acknowledgement may indicate that the client device received the configuration information 65 and is prepared to operate based on the configuration information 65 (e.g., to receive the packet exchange data 66 injected into an SOF packet 112 by the host device in a next frame, inject packet exchange data 66 into an SOF packet 112 and send the SOF packet 112 to the host device in the next frame, or both).

If the acknowledgement is received from the client device (e.g., via the receiver 80), then, in process block 152, the processor 12A may send or receive the packet exchange data 66 of the second data stream to or from the client device during the second synchronizing frame via the wireless communication link 38. In some embodiments, the processor 12A may send or receive the packet exchange data 66 of the second data stream to or from the client device if the acknowledgement is received from the client device during the same SOF (e.g., 126). In particular, the processor 12A may cause the data injector/extractor 64 to replace subsequent SOF packets 112 in subsequent frames with the packet exchange data 66. The packet exchange data 66 may include any suitable data that the host device may send to and/or receive from the client device such as user data, control information, housekeeping or maintenance data used to maintain the host and/or client devices (e.g., including data indicating a quality of the wireless communication link between the host and client devices), data related to other components and/or standards used by the host and/or client devices, and so on. Using the example of the timing diagram 110 of FIG. 6, the processor 12A may cause the data injector/extractor 64 to replace the second SOF packet 112 in SOF1 of the frame 130 with housekeeping data (HK 116) and cause the transmitter 60 to send the housekeeping data in SOF1, cause the data injector/extractor 64 to replace the fourth SOF packet 112 in SOF3 of the frame 130 with transmit data (TX 118) and cause the transmitter 60 to send the transmit data in SOF3, and cause the data injector/extractor 64 to remove the sixth SOF packet 112 in SOF5 of the frame 130 and cause the receiver 80 to receive the receive data (RX 120) in SOF5.

In this manner, the method 140 enables the host device to wirelessly send and/or receive a second data stream in the SOF packets 112, in addition to a first data stream in conventional data packets per the USB 2.0 standard. In particular, by leveraging the SOF packets 112 of the USB 2.0 standard to bidirectionally send and/or receive multiple data streams, communication using the USB 2.0 standard over the wireless communication link 38 may continue without interruption or error, while increasing overall data throughput.

Figure 8:
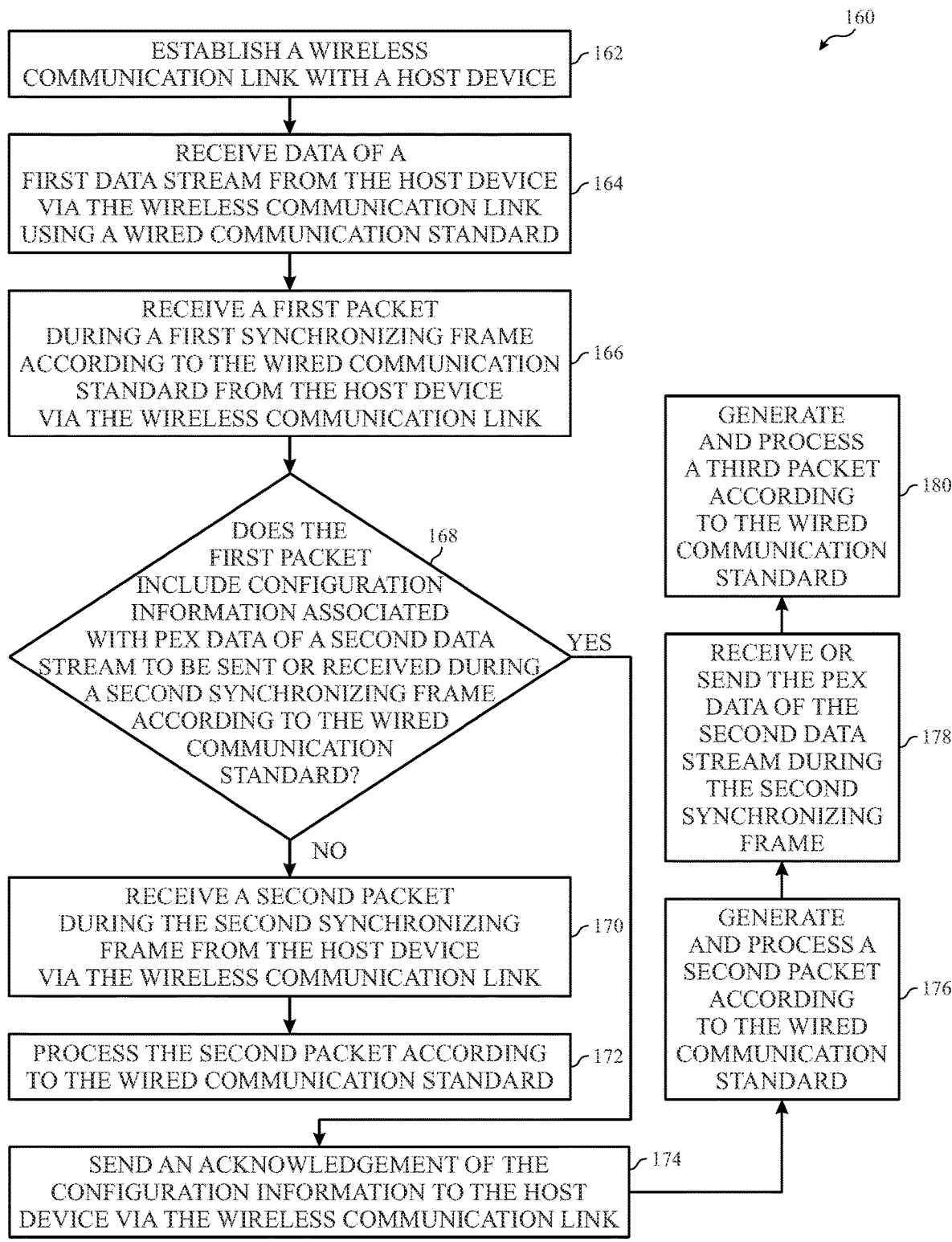
FIG. 8 is a flowchart of a method for an electronic device of FIG. 1 (e.g., a client device) to wirelessly receive and/or send a second data stream in SOF packets, according to embodiments of the present disclosure.

FIG. 8 is a flowchart of a method 160 for the electronic device 10B (e.g., the client device) to wirelessly receive and/or send a second data stream in the SOF packets 112, according to embodiments of the present disclosure. Any suitable device (e.g., a controller) that may control components of the electronic device 10B, such as the processor 12B (e.g., as processing circuitry of the transceiver 30), may perform the method 160. In some embodiments, the method 160 may be implemented by executing instructions stored in a tangible, non-transitory, computer-readable medium, such as the memory 14B or storage 16B, using the processor 12B. For example, the method 160 may be performed at least in part by one or more software components, such as an operating system of the electronic device 10B, one or more software applications of the electronic device 10B, and the like. While the method 160 is described using steps in a specific sequence, it should be understood that the present disclosure contemplates that the described steps may be performed in different sequences than the sequence illustrated, and certain described steps may be skipped or not performed altogether.

In process block 162, the processor 12B of the client device establishes the wireless communication link 38. Establishment of the wireless communication link 38 and details of the wireless communication link 38 are similar to that described in process block 142 of the method 140. In process block 164, the processor 12B receives data of a first data stream from the host device via the wireless communication link 38 using a wired communication standard. For example, the processor 12B may cause the receiver 80 of the client device to receive a data packet of a USB 2.0 data stream from the host device via the EHF link using the USB 2.0 standard.

In process block 166, the processor 12B receives a first packet during a first synchronizing frame according to the wired communication standard from the host device via the wireless communication link 38. In particular, the processor 12B may cause the receiver 80 to receive an SOF packet 112 during an SOF frame. In decision block 168, the processor 12B determines whether the first packet includes configuration information 65 associated with packet exchange data 66 of a second data stream to be sent or received during a second synchronizing frame according to the wired communication standard. That is, the processor 12B determines whether an SOF packet 112 includes configuration information 65 associated with packet exchange data 66 of a second data stream to be sent or received during a second SOF according to the USB 2.0 standard. In particular, the SOF packet 112 may be received during an SOF of a first frame of the USB 2.0 standard, and the configuration information 65 of the SOF packet 112 may indicate receiving the second SOF in a next frame.

If the processor 12B determines that the first packet does not include the configuration information 65, then, in process block 170, the processor 12B receives a second packet during the second synchronizing frame from the host device via the wireless communication link 38. In particular, the processor 12B may cause the receiver 80 to receive a second SOF packet 112 during a second SOF from the host device via the wireless communication link 38. In process block 172, the processor 12B processes the second packet according to the wired communication standard. For example, the processor 12B may perform synchronization and/or interrupt routines based on the synchronizing information of the second SOF packet 112.

If the processor 12B determines that the first packet includes the configuration information 65, then, in process block 174, the processor 12B sends an acknowledgement of the configuration information 65 to the host device via the wireless communication link 38. The acknowledgement may indicate that the client device received the configuration information 65 and is prepared to operate based on the configuration information 65 (e.g., to receive the packet exchange data 66 injected into an SOF packet 112 by the host device in a next frame, inject packet exchange data 66 into an SOF packet 112 and send the SOF packet 112 to the host device in the next frame, or both).

In process block 176, the processor 12B generates and processes a second packet according to the wired communication standard. That is, the processor 12B may cause the data extractor/injector 92 to generate synchronizing information (e.g., an SOF packet 112 or contents of the SOF packet 112), and the processor 12B may process the synchronizing information in place of the first packet having the configuration information 65. This way, it appears that the host and client devices are conforming with the USB 2.0 standard. Otherwise, if the first SOF packet 112 having the configuration information 65 were to be processed under the USB 2.0 standard, an error would result as the first SOF packet 112 would be missing synchronizing information that was removed by the data injector/extractor 64 of the host device to make room for the configuration information 65, which could cause the wireless communication link 38, or at least an overlaid USB 2.0 communication link, to break or disconnect.

In process block 178, the processor 12B receives or sends the packet exchange data 66 of the second data stream during the second synchronizing frame. Using the example of the timing diagram 110 of FIG. 6, the processor 12B may cause the receiver 80 to receive the housekeeping data in SOF1, cause the receiver 80 to receive the transmit data (TX 118) in SOF3, and cause the transmitter 60 of the client device to send the receive data (RX 120) in SOF5.

In process block 180, the processor 12B generates and processes a third packet according to the wired communication standard. That is, the processor 12B may cause the data extractor/injector 92 to generate synchronizing information, and the processor 12B may process the synchronizing information in place of the second packet having the packet exchange data 66 to conform to the USB 2.0 standard. Otherwise, if the first SOF packet 112 having the packet exchange data 66 were to be processed under the USB 2.0 standard, an error may result as the first SOF packet 112 would be missing synchronizing information that was removed by the data injector/extractor 64 of the host device and/or the client device to make room for the packet exchange data 66, which could cause the wireless communication link 38, or at least an overlaid USB 2.0 communication link, to break or disconnect.

In this manner, the method 160 enables the client device to wirelessly receive and/or send a second data stream in the SOF packets 112, in addition to a first data stream in conventional data packets per the USB 2.0 standard. In particular, by leveraging the SOF packets 112 of the USB 2.0 standard to bidirectionally receive and/or send multiple data streams, communication using the USB 2.0 standard over the wireless communication link 38 may continue without interruption or error, while increasing overall data throughput.

Figure 9:
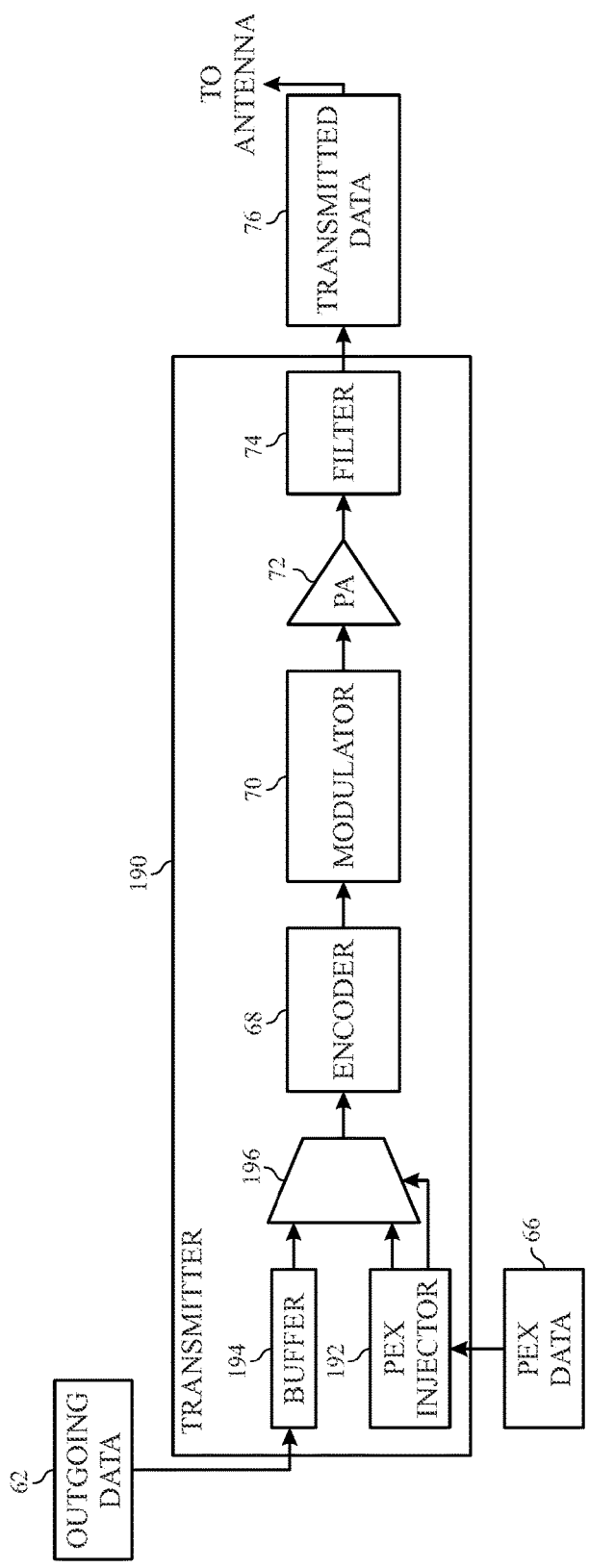
FIG. 9 is a schematic diagram of a transmitter of the electronic device of FIG. 1 that may wirelessly send packet exchange data of a second data stream during delays between sending or receiving packets of a first data stream, according to an embodiment of the present disclosure.

In additional or alternative embodiments, the host device may determine a delay (e.g., gaps in time) between sending first and second packets of a first data stream via the wireless communication link 38 according to a wired communication standard, and send and/or receive the packet exchange data 66 of a second data stream during that delay to increase data throughput. It should be understood that the delays and the injection of the packet exchange data 66 may be in compliance with the USB 2.0 standard (e.g., without violating timing requirements, data or packet standards, and so on). FIG. 9 is a schematic diagram of a transmitter 190 (e.g., a transmit circuit) of the electronic device 10 of FIG. 1 that may wirelessly send the packet exchange data 66 of a second data stream during delays between sending or receiving packets of a first data stream, according to an embodiment of the present disclosure. In particular, the transmitter 32 of the electronic device 10 of FIG. 2 may include the transmitter 190. As illustrated, the transmitter 190 may receive outgoing data 62 to be sent to another electronic device (e.g., the electronic device 10B). The outgoing data 62 may be similar to that described with respect to the transmitter 60 of FIG. 4. The transmitter 60 may include a packet exchange injector 192 (e.g., packet exchange injection circuitry and/or software) that may inject the packet exchange data 66 of a second data stream into the transmitted data 76. The packet exchange injector 192 may be part of the data-type controller 42 shown in FIG. 3.

The packet exchange injector 192 may determine a delay between sending first and second packets of a first data stream via the wireless communication link 38 according to USB 2.0 standard, and inject the packet exchange data 66 into the outgoing data 62 to be sent during the delay. The delay may correspond to a turnaround delay between the host device sending a packet (e.g., a USB 2.0 data packet) to the client device and receiving a responding packet (e.g., a USB 2.0 handshake packet) from the client device. The packet exchange data 66 and the remaining components of the transmitter 190 may be similar to those described with respect to the transmitter 60 of FIG. 4. In some embodiments, the processor 12A may extend the delay between sending first and second packets of the first data stream, and send more packet exchange data 66 during the extended delay. In such embodiments, the transmitter 190 may include a buffer 194 that delay or time-shift the outgoing data 62 during the extended delay, and selection circuitry 196 (e.g., multiplexing circuitry and/or software). In particular, the buffer 194 may delay or time-shift the outgoing data 62 on the order of 20-30 USB 2.0 high speed bit times. As illustrated, the selection circuitry 196 may be controlled by the packet exchange injector 192, which may enable transmission of either the outgoing data 62 (e.g., which may be delayed or time-shifted by the buffer 194) or the packet exchange data 66 (e.g., as injected by the packet exchange injector 192) in the transmitted data 76. In particular, during the extended delay, the packet exchange injector 192 may cause the selection circuitry 196 to select the packet exchange data 66 for transmission, and the buffer 194 may delay or time-shift the second packet of the first data stream and/or other outgoing data 2. Once the extended delay has elapsed, the packet exchange injector 192 may cause the selection circuitry 196 to select the outgoing data 62 delayed or time-shifted by the buffer 194 for transmission. In this manner, the transmitter 190 may wirelessly send the packet exchange data 66 of a second data stream during delays between sending and/or receiving packets of a first data stream, and/or extend the delays to send even more packet exchange data 66.

Figure 10:
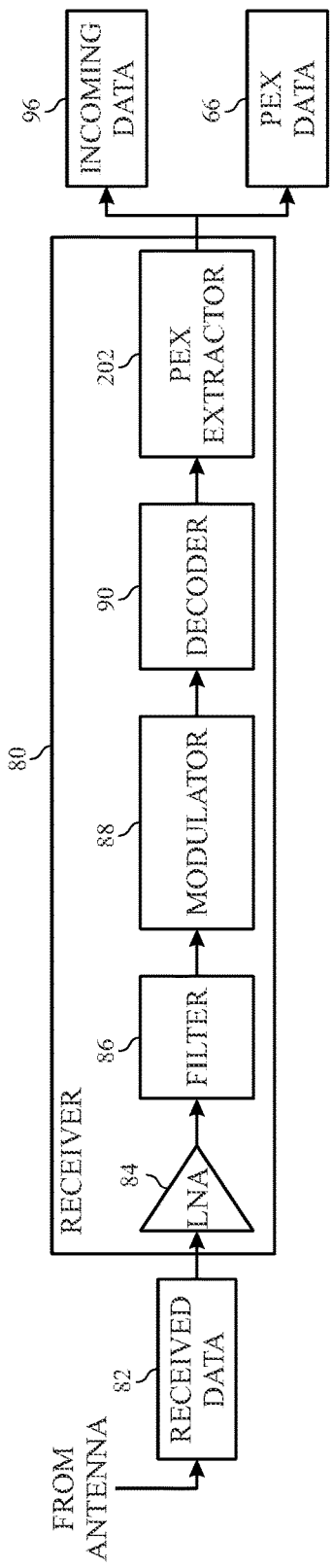
FIG. 10 is a schematic diagram of a receiver of the electronic device of FIG. 1 that may wirelessly receive packet exchange data of a second data stream during delays between receiving or sending packets of a first data stream, according to an embodiment of the present disclosure.

FIG. 10 is a schematic diagram of a receiver 200 (e.g., a receive circuit) of the electronic device 10 of FIG. 1 that may wirelessly receive the packet exchange data 66 of a second data stream during delays between receiving or sending packets of a first data stream, according to an embodiment of the present disclosure. In particular, the receiver 34 of the electronic device 10 of FIG. 2 may include the receiver 200. As illustrated, the receiver 200 may receive received data 82 from the one or more antennas 36. The received data 82 may be similar to that described with respect to the receiver 80 of FIG. 4. The receiver 200 may include a packet exchange extractor 202 (e.g., packet exchange extraction circuitry and/or software) that may extract the packet exchange data 66 of a second data stream from the received data 82. In particular, if the received data 82 is received during a delay between receiving or sending packets of a first data stream (e.g., a USB 2.0 data stream), the received data 82 may include the packet exchange data 66 of the second data stream, and the packet exchange extractor 202 may extract the packet exchange data 66 of the second data stream from the received data 82. The packet exchange extractor 202 may be part of the data-type controller 42 shown in FIG. 3. In this manner, the receiver 200 may wirelessly receive the packet exchange data 66 of a second data stream during delays between sending and/or receiving packets of a first data stream, and/or receive even more packet exchange data 66 during delays extended by a host device.

In the USB standards, data is exchanged between host and client devices using transfers, and the transfers are composed of transactions. Each transaction includes sending or receiving a number of packets, including token packets, data packets, and handshake packets. Between each packet, the host device and/or the client device may wait a minimum delay to allow the packets to propagate between the devices and/or through multiple levels of the standards. These delays include interpacket delays (e.g., delays between two successive packets sent from the host device) and turnaround delays (e.g., delays between a packet sent from the host device and a next packet sent from the client device, or delays between a packet sent from the client device and a next packet sent from the host device). The disclosed embodiments enable sending and/or receiving the packet exchange data 66 of a second data stream in these delays on the wireless communication link 38, without modifying USB 2.0 traffic of a first data stream, thus maintaining a USB 2.0 link operating on the wireless communication link 38. These embodiments may be applicable to all modes of the USB 2.0 standard (e.g., the low speed (LS) mode, the full speed (FS) mode, and the high speed (HS) mode), as well as any other suitable versions of the USB standard.

Figure 11:
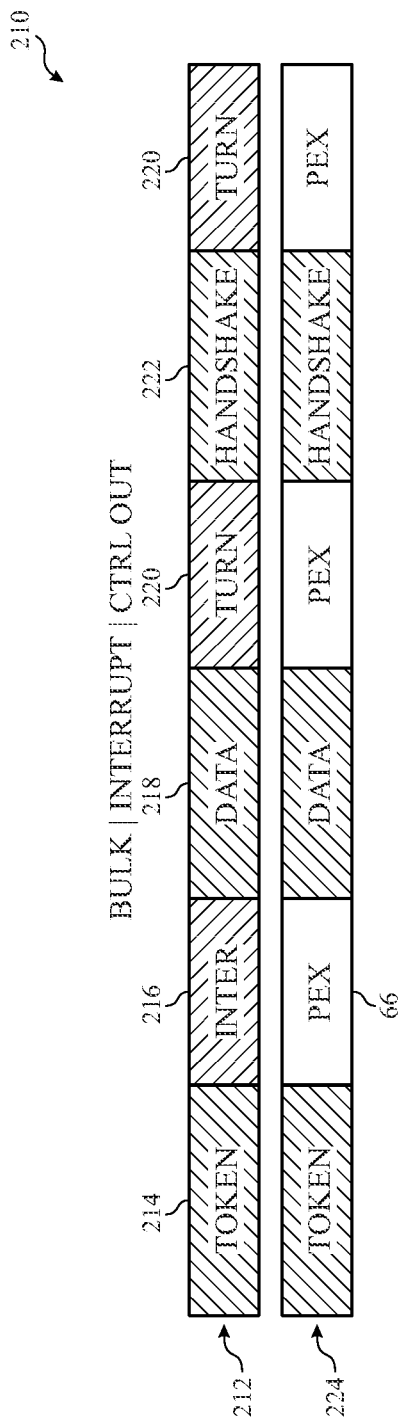
FIG. 11 is a timing diagram of sending and/or receiving packet exchange data of a second data stream during delays of the electronic device of FIG. 1 (e.g., a host device) sending a first data stream using a USB 2.0 bulk, interrupt, or control out or write transfer type, according to an embodiment of the present disclosure.

FIG. 11 is a timing diagram 210 of sending and/or receiving the packet exchange data 66 of the second data stream during delays of a host device sending a first data stream using a USB 2.0 bulk, interrupt, or control out or write transfer type, according to an embodiment of the present disclosure. In particular, the USB 2.0 bulk transfer type may be used to transfer large amounts of data transfer and guarantees delivery, but does not guarantee bandwidth or latency. The USB 2.0 interrupt transfer type may be used to poll devices to check if they have any interrupt data to transmit, and guarantees reduced latency (e.g., for quick responses). The USB 2.0 control transfer type may be used for bidirectional data transfers to query, configure, and/or issue commands to client devices.

A first row 212 of the timing diagram 210 illustrates packets of a first data stream (e.g., the USB 2.0 data stream) transferred between the host and the client devices and delays between the packets when using a USB 2.0 bulk, interrupt, or control out transfer type. In particular, when using the USB 2.0 bulk, interrupt, or control out transfer type, the host device may send a token packet 214 to the client device. The token packet 214 may indicate to the client device a type of transaction to follow. After the host device sends the token packet 214, the host device may wait an interpacket delay 216 before sending a data packet 218. The interpacket delay 216 refers to time a device (e.g., the host device) waits between sending two successive packets (e.g., the token packet 214 and the data packet 218). According to the USB 2.0 standard, the minimum interpacket delay 216 is 88 bit times and the maximum interpacket delay 216 is 192 bit times. A bit time corresponds to the time it takes for one bit to be ejected from a network interface controller operating at the theoretical maximum data rate in USB 2.0 of 480 megabits per second (Mbps).

After the host device sends the data packet 218, the host device may wait a turnaround delay 220 until receiving a handshake packet 222 from the client device. The turnaround delay 220 refers to the time between one device (e.g., the host device) sending a packet (e.g., the data packet 218) to a second device (e.g., the client device) and receiving a responding packet (e.g., the handshake packet 222) from the second device. According to the USB 2.0 standard, the fastest turnaround delay 220 is 38 bit times. The handshake packet 222 may acknowledge reception of the data packet 218 or report an error. After the host device receives the handshake packet 222 from the client device, the host device may wait another turnaround delay 220.

A second row 224 of the timing diagram 210 illustrates the packet exchange data 66 transferred between the host and the client devices during the delays 216, 220 between the packets when using a USB 2.0 bulk, interrupt, or control out or write transfer type. That is, the packet exchange injector 192 may inject the packet exchange data 66 (e.g., of a second data stream, of multiple other data streams) into the transmitted data 76 to be transferred between the host and the client devices via the transmitter 190 during the delays 216, 220.

Figure 12:
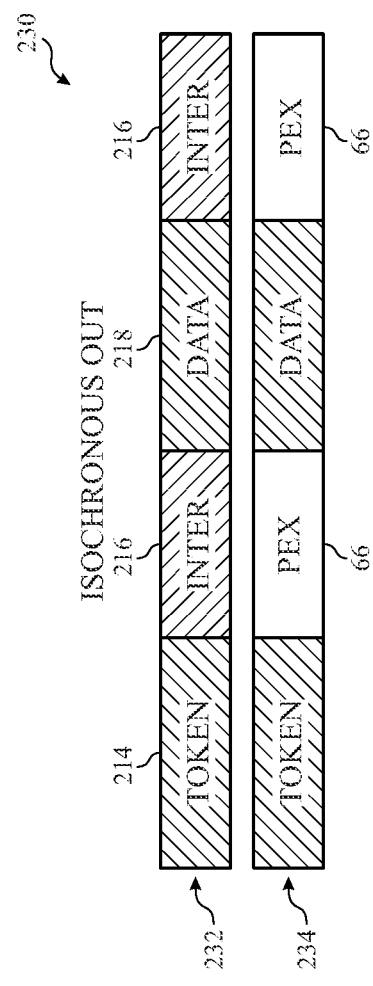
FIG. 12 is a timing diagram of sending and/or receiving packet exchange data of a second data stream during delays of the electronic device of FIG. 1 (e.g., a host device) sending a first data stream using a USB 2.0 isochronous out transfer type, according to an embodiment of the present disclosure.

FIG. 12 is a timing diagram 230 of sending and/or receiving the packet exchange data 66 of the second data stream during delays of a host device sending a first data stream using a USB 2.0 isochronous out or write transfer type, according to an embodiment of the present disclosure. In particular, the USB 2.0 isochronous transfer type may guarantee certain bandwidth and/or latency, but may include possible data loss. A first row 232 of the timing diagram 230 illustrates packets of a first data stream (e.g., the USB 2.0 data stream) transferred between the host and the client devices and delays between the packets when using a USB 2.0 isochronous out transfer type. In particular, when using the USB 2.0 isochronous out transfer type, the host device may send a token packet 214 to the client device. After the host device sends the token packet 214, the host device may wait an interpacket delay 216 before sending a data packet 218. After the host device sends the data packet 218, the host device may wait another interpacket delay 216.

A second row 234 of the timing diagram 210 illustrates the packet exchange data 66 transferred between the host and the client devices during the interpacket delays 216 between the packets when using a USB 2.0 isochronous out or write transfer type. That is, the packet exchange injector 192 may inject the packet exchange data 66 (e.g., of a second data stream, of multiple other data streams) into the transmitted data 76 to be transferred between the host and the client devices via the transmitter 190 during the interpacket delays 216.

Figure 13:
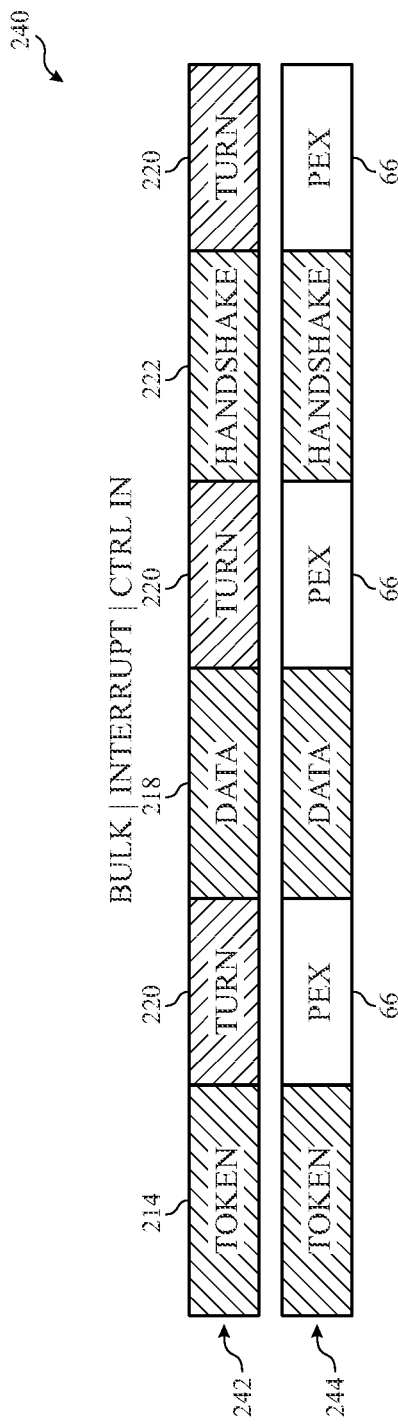
FIG. 13 is a timing diagram of sending and/or receiving packet exchange data of a second data stream during delays of the electronic device of FIG. 1 (e.g., a host device) receiving a first data stream using a USB 2.0 bulk, interrupt, or control in transfer type, according to an embodiment of the present disclosure.

FIG. 13 is a timing diagram 240 of sending and/or receiving the packet exchange data 66 of the second data stream during delays of a host device sending a first data stream using a USB 2.0 bulk, interrupt, or control in or read transfer type, according to an embodiment of the present disclosure. A first row 242 of the timing diagram 240 illustrates packets of a first data stream (e.g., the USB 2.0 data stream) transferred between the host and the client devices and delays between the packets when using a USB 2.0 bulk, interrupt, or control in transfer type. In particular, when using the USB 2.0 bulk, interrupt, or control in transfer type, the host device may send a token packet 214 to the client device. After the host device sends the token packet 214, the host device may wait a turnaround delay 220 before receiving a data packet 218 from the client device. After the client device sends the data packet 218, the client device may wait another turnaround delay 220 before receiving a handshake packet 222 from the host device. After sending the handshake packet 222, the host device may wait an additional turnaround delay 220.

A second row 244 of the timing diagram 210 illustrates the packet exchange data 66 transferred between the host and the client devices during the turnaround delays 220 between the packets when using a USB 2.0 bulk, interrupt, or control in or read transfer type. That is, the packet exchange injector 192 may inject the packet exchange data 66 (e.g., of a second data stream, of multiple other data streams) into the transmitted data 76 to be transferred between the host and the client devices via the transmitter 190 during the turnaround delays 220.

Figure 14:
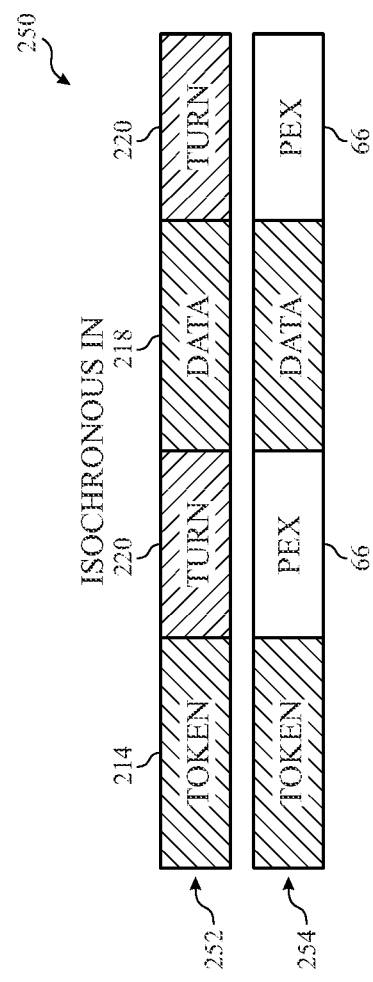
FIG. 14 is a timing diagram of sending and/or receiving packet exchange data of a second data stream during delays of the electronic device of FIG. 1 (e.g., a host device) receiving a first data stream using a USB 2.0 isochronous in transfer type, according to an embodiment of the present disclosure.

FIG. 14 is a timing diagram 250 of sending and/or receiving the packet exchange data 66 of the second data stream during delays of a host device sending a first data stream using a USB 2.0 isochronous in or read transfer type, according to an embodiment of the present disclosure. A first row 252 of the timing diagram 250 illustrates packets of a first data stream (e.g., the USB 2.0 data stream) transferred between the host and the client devices and delays between the packets when using a USB 2.0 isochronous in transfer type. In particular, when using the USB 2.0 isochronous in transfer type, the host device may send a token packet 214 to the client device. After the host device sends the token packet 214, the host device may wait a turnaround delay 220 before receiving a data packet 218 from the client device. After the client device sends the data packet 218, the client device may wait another turnaround delay 220.

A second row 244 of the timing diagram 210 illustrates the packet exchange data 66 transferred between the host and the client devices during the turnaround delays 220 between the packets when using a USB 2.0 isochronous in or read transfer type. That is, the packet exchange injector 192 may inject the packet exchange data 66 (e.g., of a second data stream, of multiple other data streams) into the transmitted data 76 to be transferred between the host and the client devices via the transmitter 190 during the turnaround delays 220.

In reference to FIGS. 11-14, and in some embodiments, the host and client devices may only send or receive the packet exchange data 66 during a subset of the delays, such as only during turnaround delays 220, only during interpacket delays 216, only during a subset of turnaround delays 220, only during a subset of interpacket delays 216, only during a subset of turnaround delays 220 and interpacket delays 216, and so on. In this manner, the host device may wirelessly send or receive one or more additional data streams during delays between sending or receiving packets of a first data stream.

To understand the throughput achievable by sending or receiving one or more additional data streams during delays between sending or receiving packets of a first data stream, as shown in FIGS. 11-14, it may be assumed that the transmitters 190 of the host and client devices are allocated a propagation delay equivalent to two hubs and their respective cables (e.g., 228 nanoseconds) for transmitting and processing the packet exchange data 66 (e.g., including packetizing the packet exchange data 66, encrypting the packet exchange data 66, and so on). Moreover, it may be assumed that the wireless communication link 38 may operate at a rate of 1 gigahertz (e.g., per mmWave technology operating on an EHF band) and, as such, 4% of the wireless communication link 38 may be used to transfer the packet exchange data 66. Additionally, with the transmitter 190 attempting to transmit the packet exchange data 66 during the interpacket delays 216 and/or the turnaround delays 220 every 183-200 nanoseconds, 23-25% of the USB 2 capacity may be used to transmit up to 40 megabits per second (Mbps).

FIG. 15 is also provided, which is a table 260 that indicates bus allocation per microframe according to the USB 2.0 standard. In particular, for each of the high speed control, high speed bulk, high speed interrupt, and high speed isochronous USB 2.0 transfer types, the table 260 indicates a maximum number of transfers per microframe, a maximum number of transactions per microframe, and, as a result, a bus utilization percentage per microframe according to the USB 2.0 standard.

FIG. 16 is a table 270 that indicates a maximum number of delays available per the USB 2.0 standard. In particular, for each of the high speed control write, high speed control read, high speed bulk out, high speed bulk in, high speed interrupt out, high speed interrupt in, high speed isochronous out, and high speed isochronous in USB 2.0 transfer types, the table 270 indicates a maximum packet length, a number of potential slots, a maximum number of interpacket delays, and a maximum number of turnaround delays per the USB 2.0 standard.

Additionally or alternatively, the presently disclosed embodiments may increase data throughput on the wireless communication link 38 between the electronic devices 10A, 10B by causing transmission or reception of a second data stream between transactions of the first data stream. That is, there may be times (e.g., idle times) when the electronic devices 10A, 10B are not performing transactions. For example, after a first transaction (e.g., as depicted by the timing diagram 240 of FIG. 13), a second transaction (e.g., also as depicted by the timing diagram 240 of FIG. 13) may be performed, both according to the USB 2.0 standard. Because no USB 2.0 data is transferred between the first and second transactions (e.g., an idle time), the packet exchange injector 192 (e.g., of either electronic device 10A, 10B) may inject packet exchange data 66 during this time. In this manner, the electronic devices 10A, 10B may wirelessly send or receive an increased amount of a second data stream (e.g., the packet exchange data 66) between transactions of a first data stream (e.g., the USB 2.0 data).

With the foregoing in mind, FIG. 17 is a table 280 that indicates maximum packet exchange data 66 throughput during turnaround delays 220 and/or idle times for scenarios where USB 2.0 data maximizes usage of the wireless communication link 38 (e.g., so-called worst case scenarios), according to an embodiment of the present disclosure. That is, the worst-case scenarios provided below include artificially high occupancy USB 2.0 conditions following the USB 2.0 guidelines, as real world conditions rarely, if ever, occupy the wireless communication link 38 as fully as these scenarios. In particular, a first row 282 of the table 280 indicates a worst-case scenario of six isochronous out and one bulk out USB 2.0 transfer types. For this scenario, the total transfer time used under the USB 2.0 standard for a 125 microsecond microframe is 115.65 microseconds, which occupies 92.52% of the microframe, and includes 2 turnaround delays 220. 8 bytes of packet exchange data 66 may be sent or received during the turnaround delays 220, which equates to 512,000 bits per second. For the remaining time of the microframe (e.g., the idle time), 184 bytes of packet exchange data 66 may be sent or received, which equates to 11,776,000 bits. Thus, the total packet exchange data 66 that may be sent or received during turnaround delays 220 and idle times is 12,288,000 bits. A second row 284 of the table 280 indicates a worst-case scenario of six isochronous out and four control write USB 2.0 transfer types. For this scenario, the total transfer time used under the USB 2.0 standard for a 125 microsecond microframe is 122 microseconds, which occupies 97.6% of the microframe, and includes 24 turnaround delays 220. 96 bytes of packet exchange data 66 may be sent or received during the turnaround delays 220, which equates to 6,144,000 bits per second. For the remaining time of the microframe (e.g., the idle time), 60 bytes of packet exchange data 66 may be sent or received, which equates to 3,840,000 bits. Thus, the total packet exchange data 66 that may be sent or received during turnaround delays 220 and idle times is 9,984,000 bits.

FIG. 18 is a table 290 that indicates maximum packet exchange data 66 throughput during interpacket delays 216 and turnaround delays 220, as well as idle times for scenarios where USB 2.0 data maximizes usage of the wireless communication link 38 (e.g., so-called worst case scenarios), according to an embodiment of the present disclosure. In particular, a first row 292 of the table 290 indicates a worst-case scenario of six isochronous out and one bulk out USB 2.0 transfer types. For this scenario, the total transfer time used under the USB 2.0 standard for a 125 microsecond microframe is 115.65 microseconds, which occupies 92.52% of the microframe, and includes 9 interpacket delays 216 and turnaround delays 220. 36 bytes of packet exchange data 66 may be sent or received during the interpacket delays 216 and the turnaround delays 220, which equates to 2,304,000 bits per second. For the remaining time of the microframe (e.g., the idle time), 184 bytes of packet exchange data 66 may be sent or received, which equates to 11,776,000 bits. Thus, the total packet exchange data 66 that may be sent or received during interpacket delays 216, turnaround delays 220, and idle times is 14,080,000 bits. A second row 294 of the table 290 indicates a worst-case scenario of six isochronous out and four control write USB 2.0 transfer types. For this scenario, the total transfer time used under the USB 2.0 standard for a 125 microsecond microframe is 122 microseconds, which occupies 97.6% of the microframe, and includes 48 interpacket delays 216 and turnaround delays 220. 192 bytes of packet exchange data 66 may be sent or received during the interpacket delays 216 and the turnaround delays 220, which equates to 12,288,000 bits per second. For the remaining time of the microframe (e.g., the idle time), 60 bytes of packet exchange data 66 may be sent or received, which equates to 3,840,000 bits. Thus, the total packet exchange data 66 that may be sent or received during the interpacket delays 216 and the turnaround delays 220 and idle times is 16,128,000 bits.

Figure 19A:
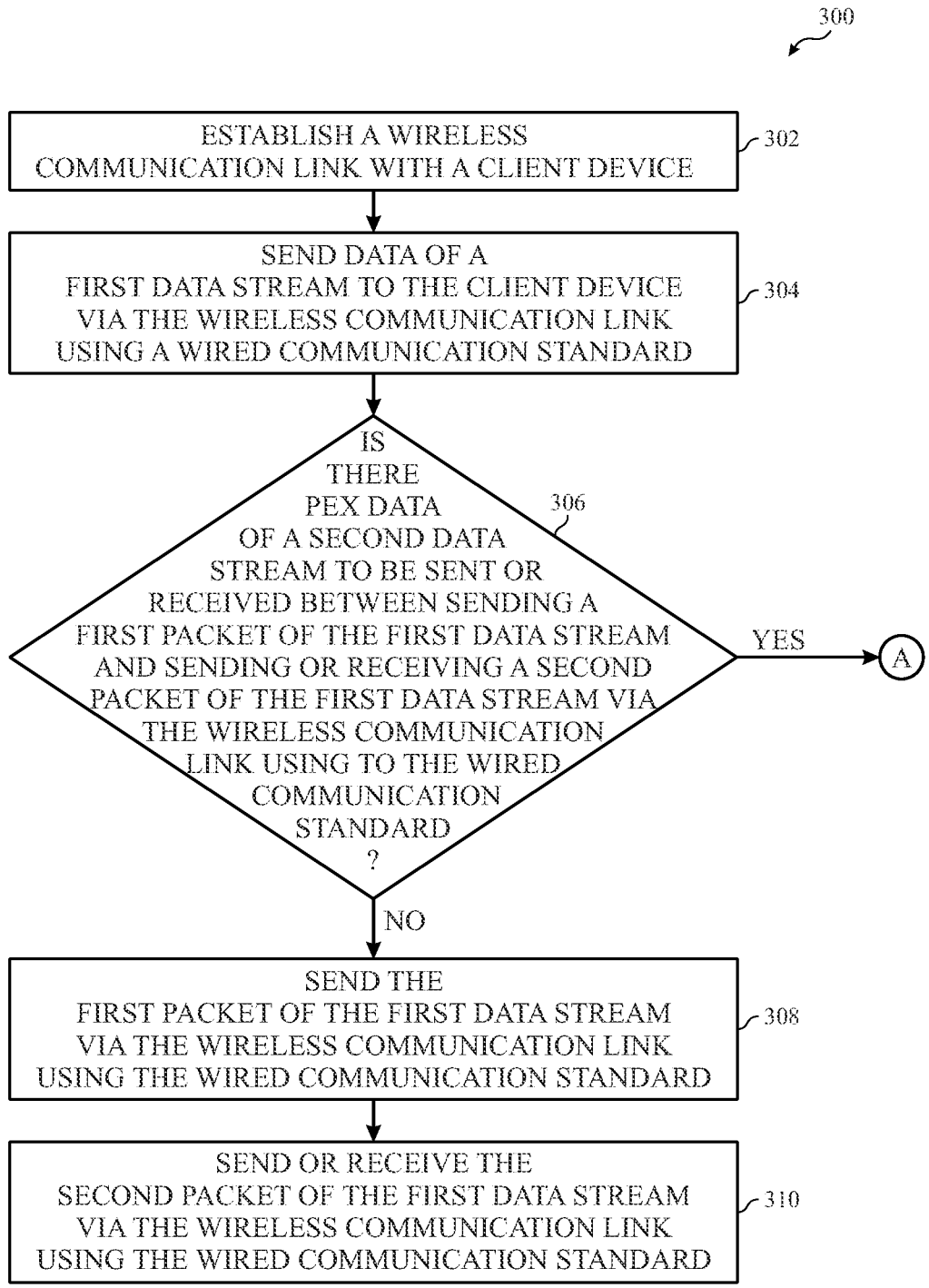
FIGS. 19A and 19B are a flowchart of a method for the electronic device of FIG. 1 (e.g., a host device) to wirelessly send and/or receive a second data stream during delays between sending or receiving packets of a first data stream, according to embodiments of the present disclosure.
Figure 19B:
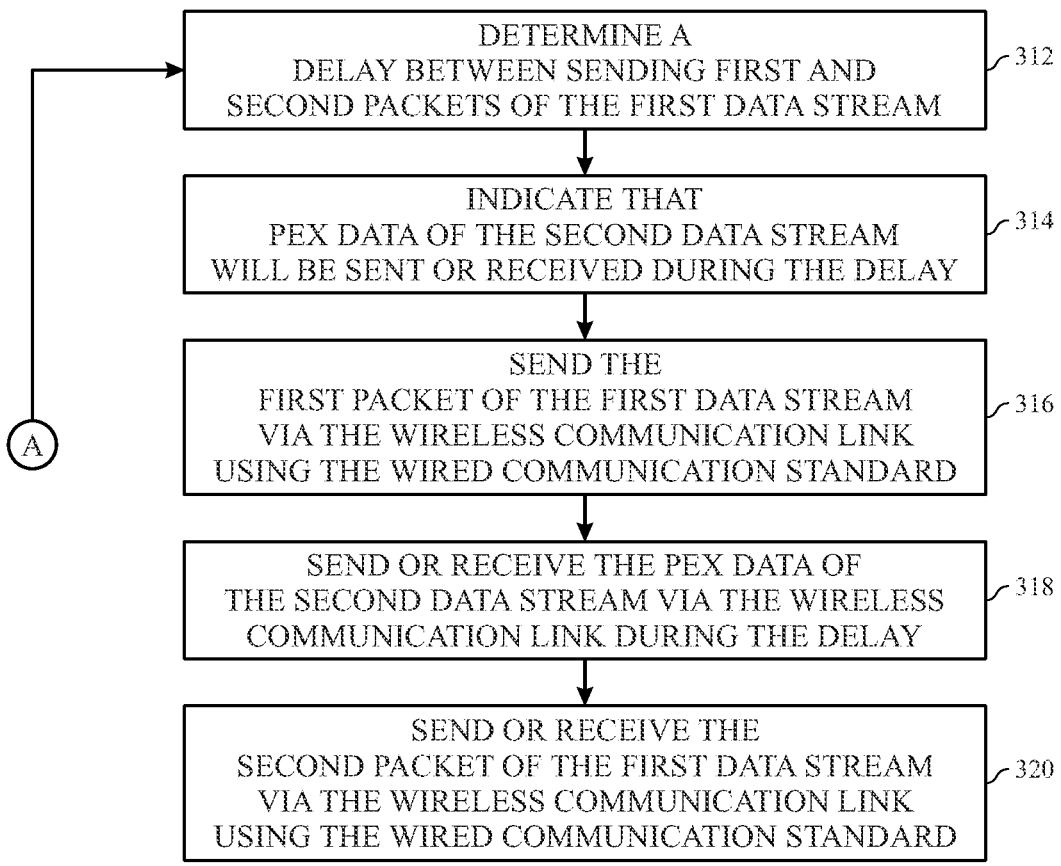

With the foregoing in mind, FIGS. 19A and 19B are a flowchart of a method 300 for the electronic device 10A (e.g., the host device) to wirelessly send and/or receive a second data stream during delays between sending or receiving packets of a first data stream, according to embodiments of the present disclosure. Any suitable device (e.g., a controller) that may control components of the electronic device 10A, such as the processor 12A (e.g., as processing circuitry of the transceiver 30), may perform the method 300. In some embodiments, the method 300 may be implemented by executing instructions stored in a tangible, non-transitory, computer-readable medium, such as the memory 14A or storage 16A, using the processor 12A. For example, the method 300 may be performed at least in part by one or more software components, such as an operating system of the electronic device 10A, one or more software applications of the electronic device 10A, and the like. While the method 300 is described using steps in a specific sequence, it should be understood that the present disclosure contemplates that the described steps may be performed in different sequences than the sequence illustrated, and certain described steps may be skipped or not performed altogether.

In process block 302, the processor 12A of the host device establishes the wireless communication link 38 with the electronic device 10B (e.g., client device). For example, the wireless communication link 38 may include the implementing mmWave technology on the EHF band (e.g., a 60 GHz band), the NFC standard, the Bluetooth® standard, any suitable wireless peer-to-peer communication technology or standard, any suitable wireless network communication technology or standard, and so on. In some embodiments, the processor 12A may subsequently establish an additional communication link (e.g., wired or wireless) on the wireless communication link 38, including any version of a USB data stream, such as USB 1, USB 2.0, USB 3, USB 4, or LVDS as used by DisplayPort. That is, the wireless communication link 38 may replicate or virtualize the USB 2.0 communication link. In some embodiments, the wireless communication link 38 is an EHF link that replicates or virtualizes the wired USB 2.0 communication link.

In process block 304, the processor 12A sends data of a first data stream to the client device via the wireless communication link 38 using a wired communication standard. For example, the processor 12A may cause the transmitter 190 of the host device to send a token packet 214, a data packet 218 (e.g., having payload data), a handshake packet 222, or the like, of a USB 2.0 data stream to the client device via the EHF link using the USB 2.0 standard.

In decision block 306, the processor 12A determines whether there is packet exchange data 66 of a second data stream to be sent or received between sending a first packet of the first data stream and sending or receiving a second packet of the first data stream via the wireless communication link 38 using to the wired communication standard. In particular, the packet exchange injector 192 may determine whether there is packet exchange data 66 to be sent or received between sending a first packet of the first data stream and sending or receiving a second packet of the first data stream via the wireless communication link 38 using to the USB 2.0 standard.

If not, in process block 308, the processor 12A sends the first packet of the first data stream via the wireless communication link 38 using the wired communication standard. That is, the processor 12A may cause the transmitter 190 to send the first packet to the client device via the EHF link using the USB 2.0 standard. In process block 310, the processor 12A sends or receives the second packet of the first data stream via the wireless communication link 38 using the wired communication standard. That is, the processor 12A may cause the transmitter 190 to send the second packet to the client device or cause the receiver 200 to receive the second packet from the client device via the EHF link using the USB 2.0 standard.

If the processor 12A determines that there is packet exchange data 66 of the second data stream to be sent or received, then, in process block 312, the processor 12A determines a delay between sending first and second packets of the first data stream. For instance, the delay may include an interpacket delay 216 between a device (e.g., the host device) sending two successive packets (e.g., a token packet 214 and a data packet 218), or a turnaround delay 220 between one device (e.g., the host device) sending a packet (e.g., a data packet 218) to another device (e.g., the client device) and receiving a responding packet (e.g., a handshake packet 222) from the other device.

In process block 314, the processor 12A indicates that the packet exchange data 66 of the second data stream will be sent or received during the delay. In particular, the processor 12A may send an indication to the client device via the transmitter 190. In some cases, the processor 12A may receive an indication of receiving the packet exchange data 66 during the delay from the client device via the receiver 200 of the client device. The indication may be sent or received during a previous delay, in the first packet of the first data stream, in a previous packet transferred between the host and client devices, and so on.

In process block 316, the processor 12A sends the first packet of the first data stream via the wireless communication link 38 using the wired communication standard, similar to process block 308. Using the timing diagram 210 of FIG. 11 as an example, the processor 12A may cause the transmitter 190 to send the data packet 218 to the client device.

In process block 318, the processor 12A sends the sends or receives the packet exchange data 66 of the second data stream via the wireless communication link 38 using the wired communication standard during the delay. That is, the processor 12A may cause the transmitter 190 to send the packet exchange or "PEX" data 66 to the client device or cause the receiver 200 to receive the packet exchange data 66 from the client device via the EHF link during the delay. Using the timing diagram 210 of FIG. 11 as an example, the processor 12A may cause the transmitter 190 to send the packet exchange data 66 to the client device or cause the receiver 200 to receive the packet exchange data 66 from the client device during the turnaround delay 220.

In process block 320, the processor 12A sends or receives the second packet of the first data stream via the wireless communication link 38 using the wired communication standard, similar to process block 310. Using the timing diagram 210 of FIG. 11 as an example, the processor 12A may cause the receiver 200 to receive the handshake packet 222 from the client device (e.g., as an acknowledgement that the client device received the data packet 218). In this manner, the method 300 enables the host device to wirelessly send or receive a second data stream during delays between sending or receiving packets of a first data stream.

Figure 20:
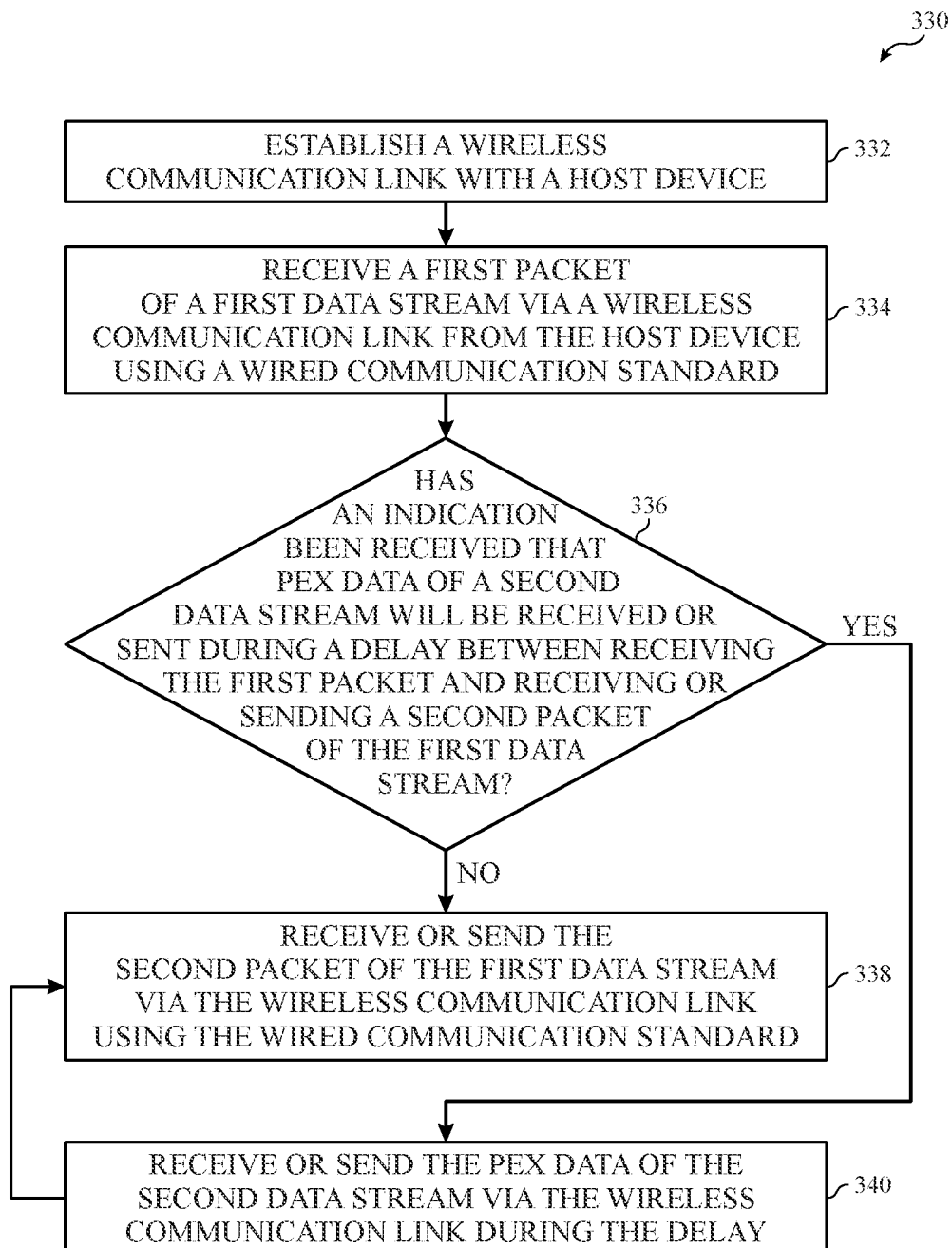
FIG. 20 is a flowchart of a method for the electronic device of FIG. 1 (e.g., a client device) to wirelessly receive and/or send a second data stream during delays between receiving or sending packets of a first data stream, according to embodiments of the present disclosure.

FIG. 20 is a flowchart of a method 330 for the electronic device 10B (e.g., the client device) to wirelessly receive and/or send a second data stream during delays between receiving or sending packets of a first data stream, according to embodiments of the present disclosure. Any suitable device (e.g., a controller) that may control components of the electronic device 10B, such as the processor 12B (e.g., as processing circuitry of the transceiver 30), may perform the method 330. In some embodiments, the method 330 may be implemented by executing instructions stored in a tangible, non-transitory, computer-readable medium, such as the memory 14B or storage 16B, using the processor 12B. For example, the method 330 may be performed at least in part by one or more software components, such as an operating system of the electronic device 10B, one or more software applications of the electronic device 10B, and the like. While the method 330 is described using steps in a specific sequence, it should be understood that the present disclosure contemplates that the described steps may be performed in different sequences than the sequence illustrated, and certain described steps may be skipped or not performed altogether.

In process block 332, the processor 12B of the client device establishes the wireless communication link 38 with the electronic device 10A (e.g., host device). Establishment of the wireless communication link 38 and details of the wireless communication link 38 are similar to that described in process block 302 of the method 300.

In process block 334, the processor 12B receives a first packet of a first data stream via the wireless communication link 38 from the host device using a wired communication standard. For example, the processor 12B may cause the receiver 200 of the client device to receive a token packet 214, a data packet 218 (e.g., having payload data), a handshake packet 222, or the like, of a USB 2.0 data stream from the host device via the EHF link using the USB 2.0 standard. Using the timing diagram 210 of FIG. 11 as an example, the processor 12B may cause the receiver 200 of the client device to receive the data packet 218.

In decision block 336, the processor 12B determines whether an indication has been received that the packet exchange data 66 of a second data stream will be received or sent during a delay between sending a first packet of the first data stream and sending or receiving a second packet of the first data stream. In particular, the processor 12B may receive the indication from the host device via the receiver 200. In some cases, the processor 12B may transmit the indication of sending the packet exchange data 66 during the delay to the host device via the transmitter 190 of the client device. The indication may be received or sent during a previous delay, in the first packet of the first data stream, in a previous packet transferred between the host and client devices, and so on.

If the processor 12B determines that the indication has not been received, then in process block 338, the processor 12B receives or sends the second packet of the first data stream via the wireless communication link 38 using the wired communication standard. That is, the processor 12A may cause the receiver 200 to receive the second packet from the host device or cause the transmitter 190 to send the second packet to the host device via the EHF link using the USB 2.0 standard.

If the processor 12B determines that the indication has been received, then, in process block 340, the processor 12B receives or sends the packet exchange data 66 of the second data stream via the wireless communication link 38 during the delay. That is, the processor 12B may cause the receiver 200 to receive the packet exchange data 66 from the host device or cause the transmitter 190 to send the packet exchange data 66 to the host device via the EHF link during the delay. Using the timing diagram 210 of FIG. 11 as an example, the processor 12B may cause the receiver 200 to receive the packet exchange data 66 from the host device or cause the transmitter 190 to send the packet exchange data 66 to the host device during the turnaround delay 220.

The processor 12B then, in process block 338, receives or sends the second packet of the first data stream via the wireless communication link 38 using the wired communication standard. Using the timing diagram 210 of FIG. 11 as an example, the processor 12B may cause the transmitter 190 to transmit the handshake packet 222 to the host device (e.g., as an acknowledgement that the client device received the data packet 218). In this manner, the method 330 enables the client device to wirelessly receive or send a second data stream during delays between receiving or sending packets of a first data stream.

Figure 21A:
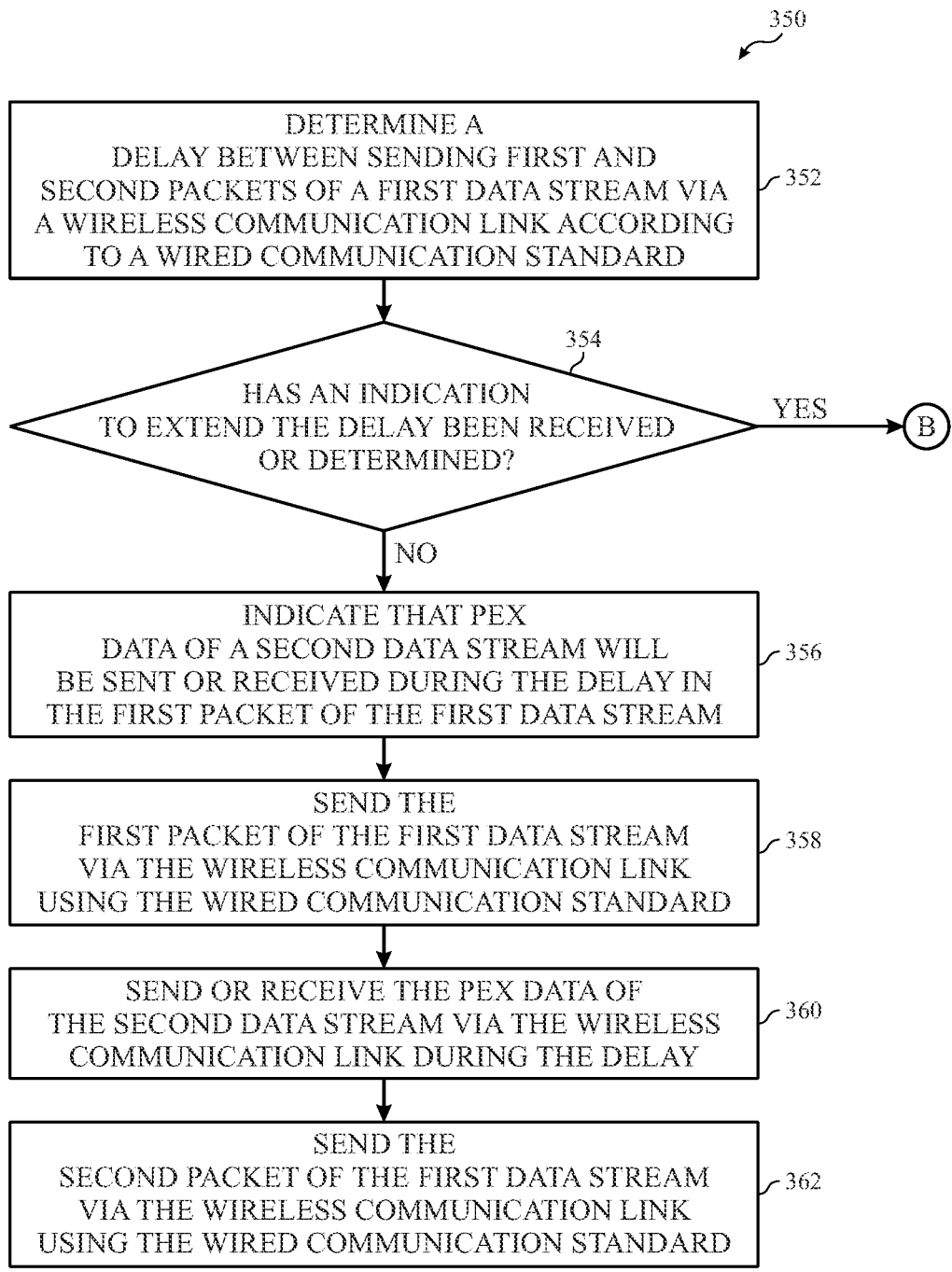
FIGS. 21A and 21B are a flowchart of a method for the electronic device of FIG. 1 (e.g., a host device) to extend a delay between sending packets of a first data stream, enabling sending or receiving more packet exchange data of a second data stream during the extended delay, according to embodiments of the present disclosure.
Figure 21B:
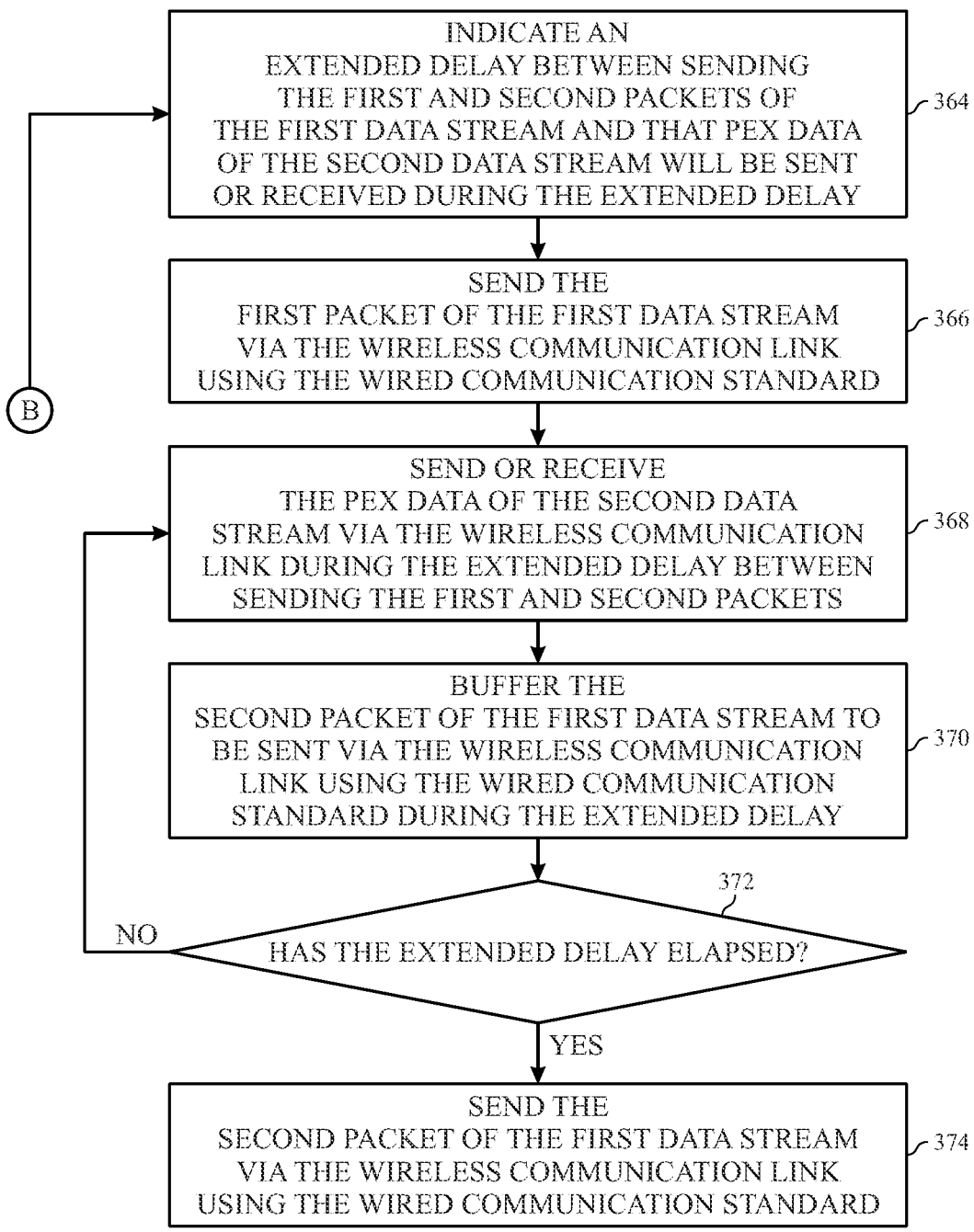

In some cases, the host device may determine to extend the delay between sending packets of the first data stream, thus increasing the time between sending the packets and increasing the amount of the packet exchange data 66 of the second data stream sent or received during the extended delay. FIGS. 21A and 21B are a flowchart of a method 350 for the electronic device 10A (e.g., the host device) to extend the delay between sending packets of a first data stream, enabling sending or receiving more packet exchange data 66 of a second data stream during the extended delay, according to embodiments of the present disclosure. Any suitable device (e.g., a controller) that may control components of the electronic device 10A, such as the processor 12A (e.g., as processing circuitry of the transceiver 30), may perform the method 350. In some embodiments, the method 350 may be implemented by executing instructions stored in a tangible, non-transitory, computer-readable medium, such as the memory 14A or storage 16A, using the processor 12A. For example, the method 350 may be performed at least in part by one or more software components, such as an operating system of the electronic device 10A, one or more software applications of the electronic device 10A, and the like. While the method 350 is described using steps in a specific sequence, it should be understood that the present disclosure contemplates that the described steps may be performed in different sequences than the sequence illustrated, and certain described steps may be skipped or not performed altogether.

The method 350 may continue from process block 312 of method 300, and, as such, in process block 352, the processor 12A of the host device determines a delay between sending first and second packets of a first data stream via a wireless communication link according to a wired communication standard. In decision block 354, the processor 12A determines whether an indication to extend the delay been received or determined. For example, the host device may determine to extend the delay because a size of the packet exchange data 66 to be transmitted is greater than a threshold size. As another example, the host device may determine to extend the delay on a periodic basis. As yet another example, the host device may determine to extend the when a size of the USB 2.0 data stream is below a threshold level. In some embodiments, at certain times, the host device may prioritize the USB 2.0 data stream (e.g., by default, as requested by a user, when a size of the USB 2.0 data stream exceeds a threshold level), and may not extend the delay during those times to ensure faster USB 2.0 data delivery. At other times, the host device may prioritize the data stream of the packet exchange data 66 (e.g., by default, as requested by a user, when a size of the data stream of the packet exchange data 66 exceeds a threshold level), and may extend the delay during those times to ensure faster packet exchange data 66 delivery.

If the processor 12A determines that the indication to extend the delay has not been received or determined, then, in process block 356, the processor 12A indicates that the packet exchange data 66 of a second data stream will be sent or received during the delay in the first packet of the first data stream, similar to process block 314 of method 300. The processor 12A then, in process block 358, sends the first packet of the first data stream via the wireless communication link 38 using the wired communication standard, similar to process block 316 of method 300. In process block 360, the processor 12A sends or receives the packet exchange data 66 of the second data stream via the wireless communication link 38 during the delay, similar to process block 318 of method 300. And in process block 362, the processor 12A sends the second packet of the first data stream via the wireless communication link 38 using the wired communication standard, similar to process block 320 of method 300.

If the processor 12A determines that the indication to extend the delay has been received or determined, then, in process block 364, indicates an extended delay between sending the first and second packets of the first data stream and that the packet exchange data 66 of the second data stream will be sent or received during the extended delay. In particular, the processor 12A may send an indication to the client device via the transmitter 190. The indication may be sent or received during a previous delay, in the first packet of the first data stream, in a previous packet transferred between the host and client devices, and so on. Using the timing diagram 210 of FIG. 11 as an example, the processor 12B may send an indication to the client device that the interpacket delay 216 between the token packet 214 and the data packet 218 will be extended.

In process block 366, the processor 12A sends the first packet of the first data stream via the wireless communication link using the wired communication standard, similar to process block 316 of method 300. Using the timing diagram 210 of FIG. 11 as an example, the processor 12B may send the token packet 214 via the EHF link using the USB 2.0 standard. In process block 368, the processor 12A sends or receives the packet exchange data 66 of the second data stream via the wireless communication link 38 during the extended delay between sending the first and second packets. That is, the processor 12A may cause the packet exchange injector 192 of the transmitter 190 to operate the selection circuitry 196 to select the packet exchange data 66 for transmission to the client device, and cause the transmitter 190 to send the packet exchange data 66 to the client device. Alternatively, the processor 12A may cause the receiver 200 to receive the packet exchange data 66 from the client device. Using the timing diagram 210 of FIG. 11 as an example, the processor 12A may cause the packet exchange injector 192 to select the packet exchange data 66 for transmission to the client device and cause the transmitter 190 to send the packet exchange data 66 to the client device, or cause the receiver 200 of the host device to receive the packet exchange data 66 from the client device, during the extended interpacket delay 216.

In process block 370, the processor 12A buffers the second packet of the first data stream to be sent via the wireless communication link 38 using the wired communication standard during the extended delay. In particular, while the packet exchange injector 192 operates the selection circuitry 196 to select the packet exchange data 66 for transmission to the client device during the extended delay, the outgoing data 62, including the second packet (and possibly more packets) of the first data stream, is delayed or time-shifted in the buffer 194. Using the timing diagram 210 of FIG. 11 as an example, the processor 12A may cause the buffer 194 to delay or time-shift the data packet 218 during the extended interpacket delay 216 while the transmitter 190 sends the packet exchange data 66 to the client device.

In process block 372, the processor 12A determines whether the extended delay has elapsed. If not, the processor 12A continues sending or receiving the packet exchange data 66 of the second data stream via the wireless communication link 38, as described in process block 368, and continues buffering the second packet of the first data stream, as well as any other packets of the first data stream that are received by the transmitter 190 during the extended delay. Using the timing diagram 210 of FIG. 11 as an example, the processor 12A may cause the buffer 194 to continue delaying or time-shifting the data packet 218 during the extended interpacket delay 216 while the transmitter 190 continues to send the packet exchange data 66 to the client device.

If the processor 12A determines that the extended delay has elapsed, then, in process block 374, the processor 12A sends the second packet of the first data stream via the wireless communication link 38 using the wired communication standard. In particular, the processor 12A may cause the packet exchange injector 192 to operate the selection circuitry 196 to select the outgoing data 62 (e.g., including the second packet and any other buffered packets of the first data stream) delayed or time-shifted by the buffer 194 for transmission via the EHF link 38 using the USB 2.0 standard. Using the timing diagram 210 of FIG. 11 as an example, the processor 12A may cause the packet exchange injector 192 to operate the selection circuitry 196 to select the data packet 218 delayed or time-shifted by the buffer 194 for transmission to the client device. In this manner, the method 350 enables the host device to extend the delay between sending packets of a first data stream, enabling sending or receiving more packet exchange data 66 of a second data stream during the extended delay.

Figure 22:
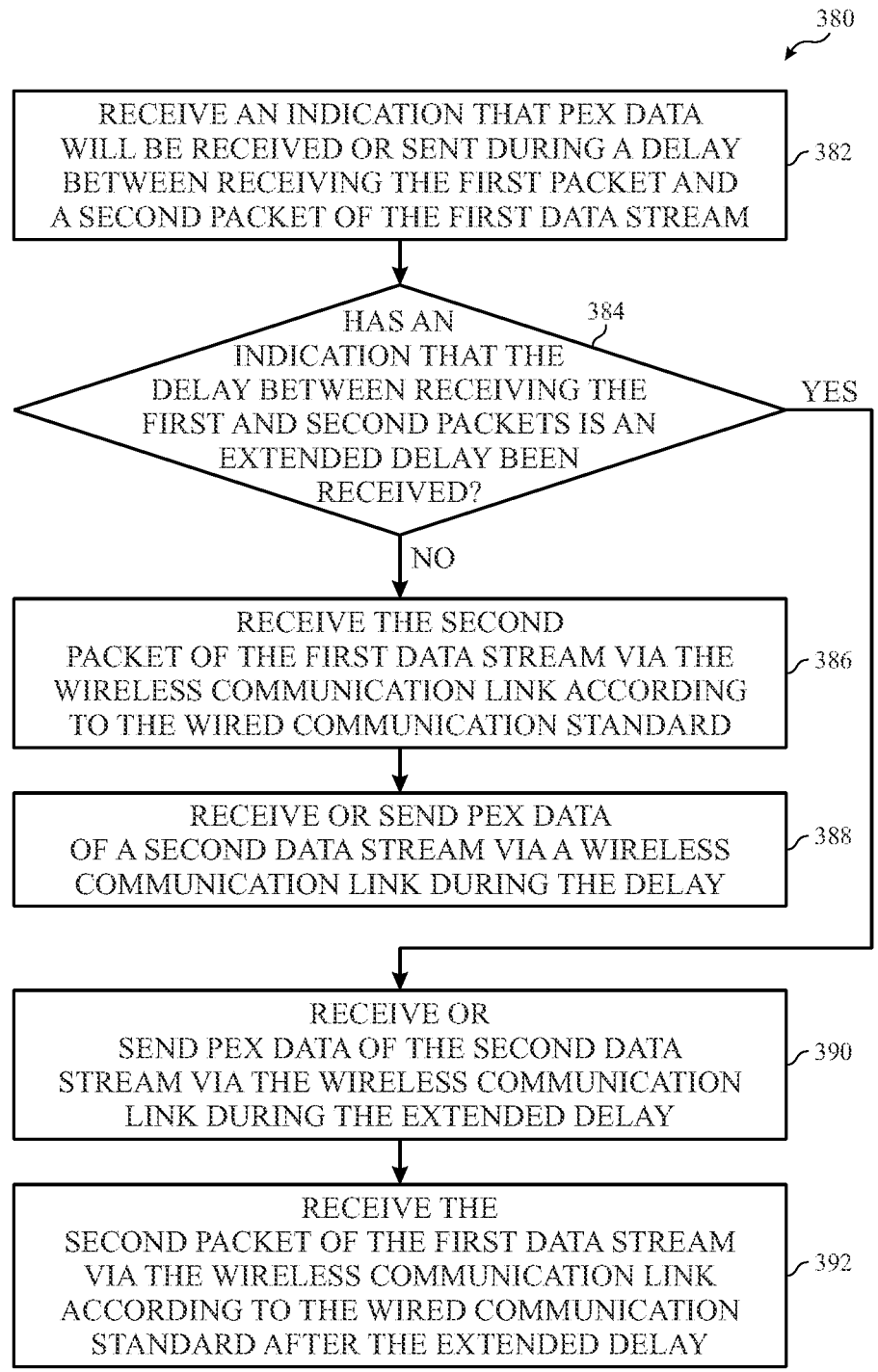
FIG. 22 is a flowchart of a method for the electronic device of FIG. 1 (e.g., a client device) to receive or send more packet exchange data of a second data stream during an extended delay between receiving packets of a first data stream, according to embodiments of the present disclosure.

FIG. 22 is a flowchart of a method 380 for the electronic device 10B (e.g., the client device) to receive or send more packet exchange data 66 of a second data stream during an extended delay between receiving packets of a first data stream, according to embodiments of the present disclosure. Any suitable device (e.g., a controller) that may control components of the electronic device 10B, such as the processor 12B (e.g., as processing circuitry of the transceiver 30), may perform the method 380. In some embodiments, the method 380 may be implemented by executing instructions stored in a tangible, non-transitory, computer-readable medium, such as the memory 14B or storage 16b, using the processor 12B. For example, the method 380 may be performed at least in part by one or more software components, such as an operating system of the electronic device 10B, one or more software applications of the electronic device 10B, and the like. While the method 380 is described using steps in a specific sequence, it should be understood that the present disclosure contemplates that the described steps may be performed in different sequences than the sequence illustrated, and certain described steps may be skipped or not performed altogether.

The method 380 may continue from decision block 336 of method 300, and, as such, in process block 382, the processor 12B of the client device receives an indication that the packet exchange data 66 will be received or sent during a delay between receiving the first packet and a second packet of the first data stream. In decision block 384, the processor 12B determines whether an indication that the delay between receiving the first and second packets is an extended delay been received. In particular, the processor 12B may receive the indication from the host device via the receiver 200. The indication may be received during a previous delay, in the first packet of the first data stream, in a previous packet transferred between the host and client devices, and so on.

If the processor 12B determines that the indication that the delay is an extended delay has not been received, then, in process block 386, the processor 12B receives or sends the packet exchange data 66 of a second data stream via the wireless communication link 38 during the delay, similar to process block 340 of method 330. In process block 388, the processor 12B then receives the second packet of the first data stream via the wireless communication link 38 according to the wired communication standard, similar to process block 338 of method 330.

If the processor 12B determines that the indication that the delay is an extended delay has been received, then, in process block 390, the processor 12B receives or sends the packet exchange data 66 of the second data stream via the wireless communication link 38 during the extended delay. That is, the processor 12B may cause the receiver 200 to receive the packet exchange data 66 from the host device or cause the transmitter 190 to send the packet exchange data 66 to the host device via the EHF link during the extended delay. Using the timing diagram 210 of FIG. 11 as an example, assuming the interpacket delay 216 has been extended by the host device, the processor 12B may cause the receiver 200 to receive the packet exchange data 66 from the host device or cause the transmitter 190 to send the packet exchange data 66 to the host device during the extended interpacket delay 216.

Figure 23:
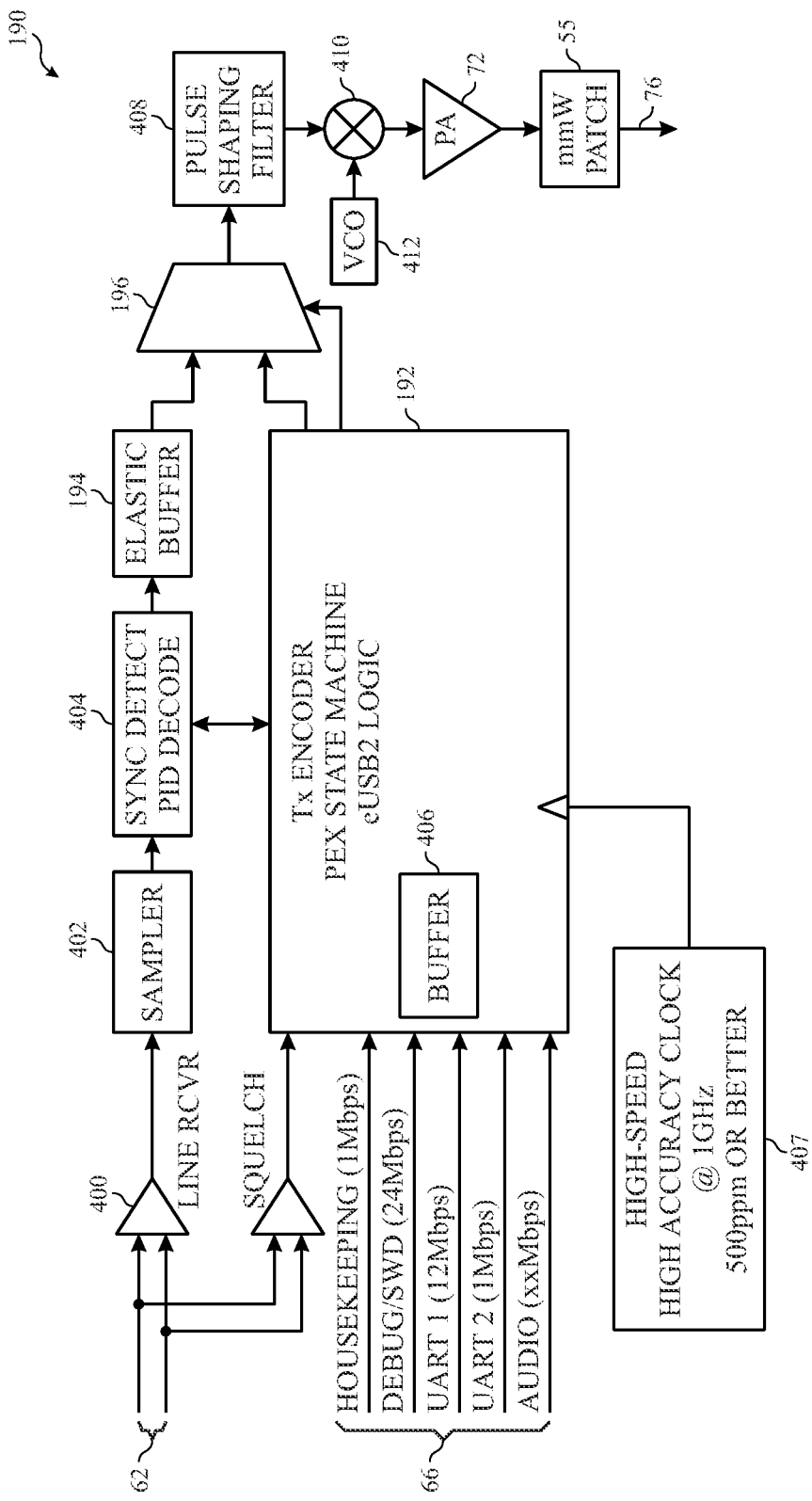
FIG. 23 is a more detailed schematic diagram of the transmitter of FIG. 9, according to an embodiment of the present disclosure.

The processor 12B then, in process block 392, receives the second packet of the first data stream via the wireless communication link 38 according to the wired communication standard after the extended delay. That is, the processor 12B may cause the receiver 200 to receive the second packet from the host device via the EHF link using the USB 2.0 standard. Using the timing diagram 210 of FIG. 11 as an example, the processor 12B may cause the receiver 200 to receive the data packet 218 from the host device. In this manner, the method 350 enables the client device to receive or send more packet exchange data 66 of a second data stream during an extended delay between receiving packets of a first data stream FIG. 23 is a more detailed schematic diagram of the transmitter 190 of FIG. 9, according to an embodiment of the present disclosure. As illustrated, the outgoing data 62 may be received at a line receiver 400, and traverse through a sampler 402 (e.g., sampling circuitry or software), a synchronization detector and packet identifier (PID) decoder 404 (e.g., synchronization detection circuitry/software that detects a synchronization or "sync" field of a packet of the outgoing data 62, PID decoding circuitry/software that decodes a packet identifier of a packet of the outgoing data 62), and an elastic buffer (e.g., the buffer 194), which may enabling buffering the outgoing data 62 (e.g., packets of a first data stream) when the processor 12 extends delays between packets of the first data stream. In particular, the buffer 194 may delay or time-shift the outgoing data 62 on the order of 20-30 USB 2.0 high speed bit times. As illustrated, the packet exchange data 66 may include housekeeping data, debugging and/or serial wire debugging (SWD) data, UART data (e.g., UART1, UART2), and/or audio data. In some embodiments, the packet exchange data 66 may be delayed or time-shifted by buffer 406 of a combination transmit encoder, packet exchange (PEX) state machine, and eUSB2 (embedded USB 2.0) logic (e.g., which collectively may be included in the packet exchange injector 192 of FIG. 9 and/or the data-type controller 42 of FIG. 3), until the processor 12 is ready to send the packet exchange data 66. That is, packet exchange injector 192 may include transmission encoding circuitry and/or software, a packet exchange state machine (e.g., a state machine that determines how to process the outgoing packet exchange data 66), and/or logic for implementing and/or operating embedded USB 2.0 (e.g., for processing the outgoing USB 2.0 data 62). eUSB2 is a supplement to the USB 2.0 specification that addresses issues related to interface controller integration with advanced system-on-chip (SoC) process nodes. As with the buffer 194, the buffer 406 may delay or time-shift the packet exchange data 66 on the order of 20-30 USB 2.0 high speed bit times. It should be understood that the term "logic" may include software (e.g., machine-executable instructions stored in memory, such as the memory 14), hardware (e.g., circuitry), or both. The packet exchange injector 192 may receive a high-speed high accuracy clock 407 (e.g., operating at 1 gigahertz±500 parts per million (ppm) or better) for operation.

The packet exchange injector 192 may operate the selection circuitry 196 to select the outgoing data 62 or the packet exchange data 66, the output of which may traverse through a pulse shaping filter 408 and a mixer 410 to be mixed with a voltage-controlled oscillator 412. The output may be amplified by the power amplifier 72, and then be transmitted as the transmitted data 76 by an mmWave patch antenna (e.g., the antenna 36).

Figure 24:
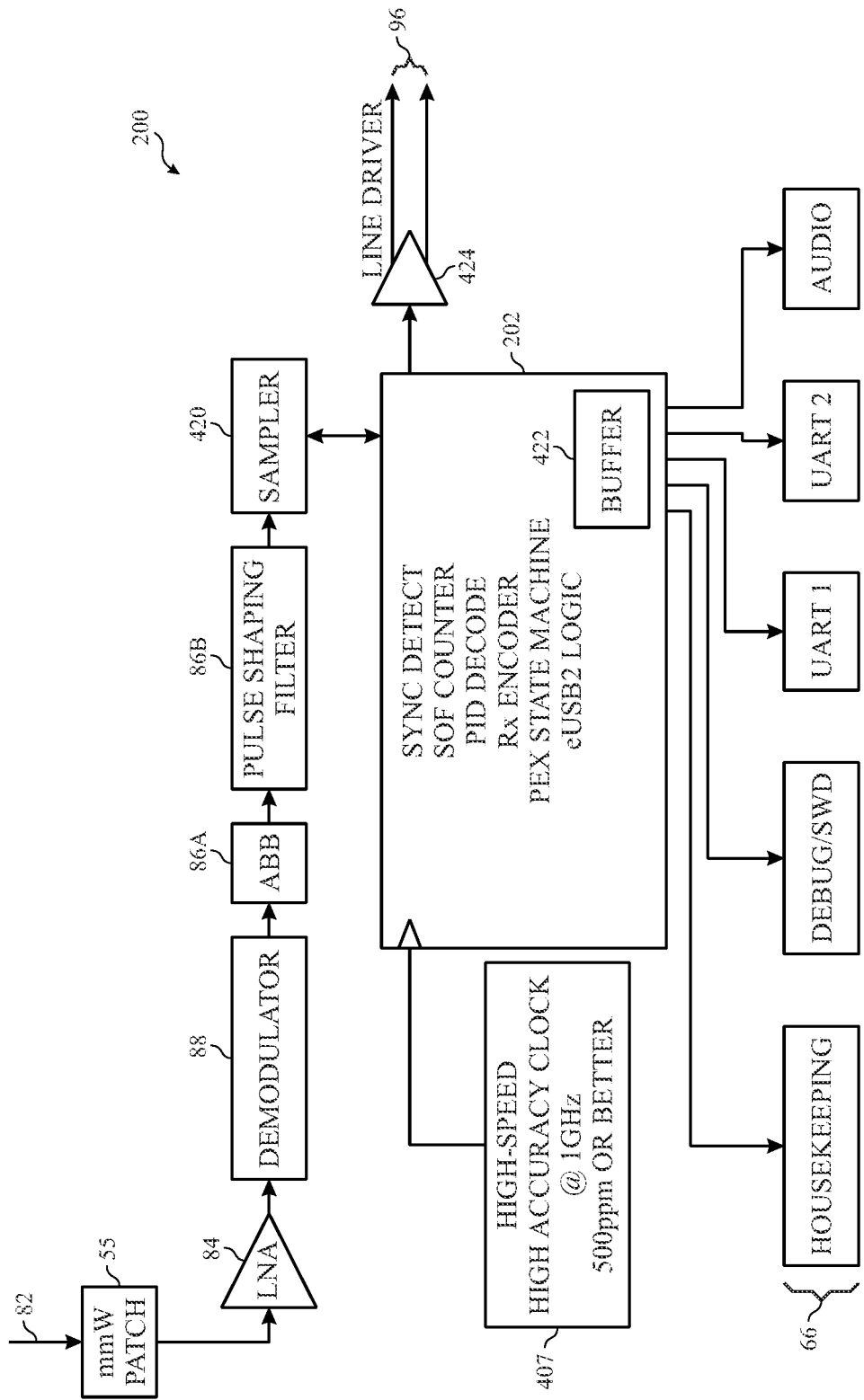
FIG. 24 is a more detailed schematic diagram of the receiver of FIG. 10, according to an embodiment of the present disclosure.

FIG. 24 is a more detailed schematic diagram of the receiver 200 of FIG. 10, according to an embodiment of the present disclosure. As illustrated, the received data 82 is received at an mmWave patch antenna (e.g., the antenna 36), and is sent through the low noise amplifier 84, the demodulator 88, an analog baseband filter 86A and a pulse shaping filter 86B (e.g., the one or more filters 86), a sampler 420 (e.g., sampling circuitry and/or software), and a combination synchronization detector, SOF counter, PID decoder, receive decoder, a packet exchange state machine (e.g., which collectively may be included in the packet exchange extractor 202 of FIG. 10 and/or the data-type controller 42 of FIG. 3), and eUSB2 logic. That is, the packet exchange extractor 202 may include synchronization detecting circuitry and/or software, SOF counting circuitry and/or software, PID decoding circuitry and/or software, receive decoding circuitry and/or software, a packet exchange state machine (e.g., for processing the incoming packet exchange data 66), and/or logic for implementing and/or operating embedded USB 2.0 (e.g., for processing the incoming USB 2.0 data 96). The packet exchange extractor 202 may extract the packet exchange data 66 from the received data 82, and delay or time-shift the packet exchange data 66 in a buffer 422 until ready for processing. The buffer 422 may delay or time-shift the packet exchange data 66 on the order of 20-30 USB 2.0 high speed bit times. As illustrated, the packet exchange data 66 may include housekeeping data, debugging and/or serial wire debugging (SWD) data, UART data (e.g., UART1, UART2), audio data, and the like. The packet exchange extractor 202 may send the incoming data 62 to a line driver 424 for processing.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
    establishing, via at least one processor, a wireless communication link with an electronic device;
    sending, via the at least one processor, data of a first data stream to the electronic device via the wireless communication link using a wired communication standard;
    generating, via the at least one processor, a packet to be sent during a first synchronizing frame of the wired communication standard by replacing synchronizing information with configuration information indicating that packet exchange data of a second data stream is to be sent or received during a second synchronizing frame of the wired communication standard;
    sending, via the at least one processor, the packet to the electronic device via the wireless communication link;
    receiving, via the at least one processor, an acknowledgement from the electronic device via the wireless communication link; and
    sending or receiving, via the at least one processor, the packet exchange data of the second data stream to or from the electronic device via the wireless communication link.

2. The method of claim 1, wherein the wired communication standard comprises one of a Universal Serial Bus (USB) 1 standard, a USB 2.0 standard, a USB 3 standard, a USB 4 standard, a low-voltage differential signaling standard as used by a DisplayPort digital display interface, or a universal asynchronous receiver-transmitter standard.

3. The method of claim 1, wherein the configuration information identifies the second synchronizing frame during which the packet exchange data is to be sent or received.

4. The method of claim 1, wherein the second data stream comprises a Universal Serial Bus data stream, a universal asynchronous receiver/transmitter data stream, a Serial Peripheral Interface data stream, or an Inter-Integrated Circuit data stream.

5. The method of claim 1, wherein receiving, via the at least one processor, the acknowledgement from the electronic device via the wireless communication link occurs during the first synchronizing frame.

6. An electronic device, comprising:
    one or more antennas;
    transmit circuitry configured to transmit signals via the one or more antennas;
    receive circuitry configured to receive signals from the one or more antennas; and
    at least one processor coupled to the transmit circuitry and the receive circuitry, the at least one processor configured to:
        establish a wireless communication link with an additional electronic device;
        cause the receive circuitry to receive data of a first data stream from the additional electronic device via the wireless communication link using a wired communication standard;
        cause the receive circuitry to receive a first packet during a first synchronizing frame of the wired communication standard from the additional electronic device via the wireless communication link; and
        in response to determining that the first packet comprises configuration information associated with packet exchange data of a second data stream to be sent or received during a second synchronizing frame of the wired communication standard:
            generate and process a second packet according to the wired communication standard; and
            cause the receive circuitry to receive or the transmit circuitry to transmit the packet exchange data of the second data stream to the additional electronic device during the second synchronizing frame of the wired communication standard.

7. The electronic device of claim 6, wherein the second packet is configured to facilitate synchronization or interruption functions between the electronic device and the additional electronic device.

8. The electronic device of claim 6, wherein the second packet comprises a start of frame packet according to the wired communication standard.

9. The electronic device of claim 6, wherein the first synchronizing frame and the second synchronizing frame each comprises between 158.33 and 200 nanoseconds.

10. The electronic device of claim 6, wherein the first packet and the second packet each comprises between 76 and 96 bits.

11. The electronic device of claim 6, wherein a first frame of the wired communication standard comprises a first plurality of synchronizing frames, wherein the first plurality of synchronizing frames comprises the first synchronizing frame, wherein a second frame comprises a second plurality of synchronizing frames, and wherein the second plurality of synchronizing frames comprises the second synchronizing frame.

12. The electronic device of claim 11, wherein the first frame and the second frame each comprises one millisecond.

13. The electronic device of claim 6, wherein the at least one processor is configured to, in response to determining that the configuration information is associated with packet exchange data of a third data stream to be sent or received during a third synchronizing frame of the wired communication standard and packet exchange data of a fourth data stream to be sent or received during a fourth synchronizing frame of the wired communication standard:
  cause the receive circuitry to receive or the transmit circuitry to transmit the packet exchange data of the third data stream to the additional electronic device during the third synchronizing frame of the wired communication standard; and
  cause the receive circuitry to receive or the transmit circuitry to transmit the packet exchange data of the fourth data stream to the additional electronic device during the fourth synchronizing frame of the wired communication standard.

14. The electronic device of claim 13, wherein a frame of the wired communication standard comprises the second synchronizing frame, the third synchronizing frame, and the fourth synchronizing frame, and wherein a total time of the second synchronizing frame, the third synchronizing frame, and the fourth synchronizing frame comprises between 474.99 and 600 nanoseconds.

15. The electronic device of claim 13, wherein a frame of the wired communication standard comprises the second synchronizing frame, the third synchronizing frame, and the fourth synchronizing frame, and wherein a total size of the packet exchange data of the second synchronizing frame, the packet exchange data of the third synchronizing frame, and the packet exchange data of the fourth synchronizing frame comprises between 228 and 288 bits.

16. The electronic device of claim 6, wherein the at least one processor is configured to generate and process a third packet according to the wired communication standard in place of the packet exchange data of the second data stream received or transmitted during the second synchronizing frame of the wired communication standard.

17. The electronic device of claim 6, wherein the configuration information indicates a type of data of the packet exchange data.

18. The electronic device of claim 17, wherein the type of data of the packet exchange data comprises user data, control information, maintenance data, or any combination thereof.

19. One or more tangible, non-transitory, computer-readable media, comprising instructions that, when executed by one or more processors, cause the one or more processors to:
  establish a wireless communication link with an electronic device;
  send data of a first data stream to the electronic device via the wireless communication link using a wired communication standard;
  generate a packet to be sent during a first synchronizing frame of the wired communication standard by replacing synchronizing information with configuration information indicating that packet exchange data of a second data stream is to be sent or received during a second synchronizing frame of the wired communication standard;
  send the packet to the electronic device via the wireless communication link;
  receive an acknowledgement from the electronic device via the wireless communication link; and
  send or receive the packet exchange data of the second data stream to or from the electronic device via the wireless communication link.

20. The one or more tangible, non-transitory, computer-readable media of claim 19, wherein the wired communication standard comprises one of a Universal Serial Bus (USB) 1 standard, a USB 2.0 standard, a USB 3 standard, a USB 4 standard, a low-voltage differential signaling standard as used by a DisplayPort digital display interface, or a universal asynchronous receiver-transmitter standard.

21. The one or more tangible, non-transitory, computer-readable media of claim 19, wherein the configuration information identifies the second synchronizing frame during which the packet exchange data is to be sent or received.

22. The one or more tangible, non-transitory, computer-readable media of claim 19, wherein the second data stream comprises a Universal Serial Bus data stream, a universal asynchronous receiver/transmitter data stream, a Serial Peripheral Interface data stream, or an Inter-Integrated Circuit data stream.

23. The one or more tangible, non-transitory, computer-readable media of claim 19, wherein the instructions that, when executed by the one or more processors, cause the one or more processors to receive the acknowledgement from the electronic device via the wireless communication link occurs during the first synchronizing frame.

24. The one or more tangible, non-transitory, computer-readable media of claim 19, wherein the instructions that, when executed by the one or more processors, cause the one or more processors to send the packet exchange data of the second data stream to the electronic device via the wireless communication link.

25. The one or more tangible, non-transitory, computer-readable media of claim 19, wherein the instructions that, when executed by the one or more processors, cause the one or more processors to receive the packet exchange data of the second data stream from the electronic device via the wireless communication link.

* * * * *